United States Patent
Oh et al.

(10) Patent No.: US 10,455,514 B2
(45) Date of Patent: Oct. 22, 2019

(54) METHOD AND DEVICE FOR TRANSMITTING SIGNAL IN WIRELESS COMMUNICATION SYSTEM

(71) Applicant: Samsung Electronics Co., Ltd., Suwon-si, Gyeonggi-do (KR)

(72) Inventors: Jin-Young Oh, Seoul (KR); Seung-Hoon Choi, Seongnam-si (KR); Young-Woo Kwak, Suwon-si (KR); Hoon-Dong Noh, Suwon-si (KR); Dong-Han Kim, Osan-si (KR); Cheol-Kyu Shin, Suwon-si (KR); Youn-Sun Kim, Seongnam-si (KR); Sang-Min Ro, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/745,512

(22) PCT Filed: Jul. 15, 2016

(86) PCT No.: PCT/KR2016/007765
§ 371 (c)(1),
(2) Date: Jan. 17, 2018

(87) PCT Pub. No.: WO2017/014510
PCT Pub. Date: Jan. 26, 2017

(65) Prior Publication Data
US 2018/0213484 A1    Jul. 26, 2018

Related U.S. Application Data

(60) Provisional application No. 62/193,849, filed on Jul. 17, 2015, provisional application No. 62/200,930,
(Continued)

(51) Int. Cl.
*H04W 52/14* (2009.01)
*H04W 52/38* (2009.01)
(Continued)

(52) U.S. Cl.
CPC ......... *H04W 52/146* (2013.01); *H04W 52/38* (2013.01); *H04W 52/42* (2013.01);
(Continued)

(58) Field of Classification Search
None
See application file for complete search history.

(56) References Cited

U.S. PATENT DOCUMENTS

| | | | |
|---|---|---|---|
| 2014/0105077 A1* | 4/2014 | Chen | H04J 3/1694 370/280 |
| 2014/0295909 A1* | 10/2014 | Ouchi | H04W 52/242 455/522 |

(Continued)

FOREIGN PATENT DOCUMENTS

| WO | 2015-012654 A1 | 1/2015 |
|---|---|---|
| WO | 2015-056924 A1 | 4/2015 |

OTHER PUBLICATIONS

Intel; "On coverage enhancements for PUSCH for MTC"; 3GPP TSG RAN WG1 Meeting #80; Feb. 9-13, 2015; Athens, Greece; R1-150748.

(Continued)

*Primary Examiner* — Mohammed Rachedine
(74) *Attorney, Agent, or Firm* — Jefferson IP Law, LLP

(57) ABSTRACT

Disclosed are a communication technique for merging, with IoT technology, a 5G communication system for supporting a data transmission rate higher than that of a 4G system, and a system therefor. The disclosed technique and system can be applied to intelligent services (for example, smart home, smart building, smart city, smart car or connected car, health (Continued)

care, digital education, retailing, security and safety related services, and the like) on the basis of 5G communication technology and IoT related technology. A method for controlling uplink transmission power of a terminal in a wireless communication system comprises the steps of: initializing a power control adjustment value when a repetition level for a coverage enhancement mode is changed; updating the power control adjustment value according to a transmission power control (TPC) command received from a base station; calculating uplink transmission power on the basis of the updated power control adjustment value and the repetition level; and transmitting uplink data or control information by the calculated uplink transmission power.

20 Claims, 20 Drawing Sheets

Related U.S. Application Data filed on Aug. 4, 2015, provisional application No. 62/207,619, filed on Aug. 20, 2015, provisional application No. 62/245,538, filed on Oct. 23, 2015.

(51) Int. Cl.
| | |
|---|---|
| *H04W 72/04* | (2009.01) |
| *H04W 52/42* | (2009.01) |
| *H04W 52/50* | (2009.01) |
| *H04W 52/24* | (2009.01) |
| *H04W 52/36* | (2009.01) |

(52) U.S. Cl.
CPC ........ *H04W 72/044* (2013.01); *H04W 52/242* (2013.01); *H04W 52/36* (2013.01); *H04W 52/50* (2013.01)

(56) References Cited

U.S. PATENT DOCUMENTS

2015/0181533 A1    6/2015  Chen et al.
2015/0358916 A1*  12/2015  Park .................... H04W 52/146
                                              455/522

OTHER PUBLICATIONS

Intel; "PBCH repetitions for coverage enhancement for MTC"; 3GPP TSG RAN WG1 Meeting #80; Feb. 9-13, 2015; Athens, Greece; R1-150083.

* cited by examiner

|  | SUBFRAME (i-1) | SUBFRAME i | SUBFRAME (i+1) | SUBFRAME (i+2) |
|---|---|---|---|---|
| 501 UE 1 | PUCCH | PUCCH | PUCCH | PUCCH |
| 505 UE 1 OCC 1 | 1 | 1 | 1 | 1 |
| 502 UE 2 | PUCCH | PUCCH | PUCCH | PUCCH |
| 506 UE 2 OCC 2 | 1 | -1 | 1 | -1 |
| 503 UE 3 | PUCCH | PUCCH | PUCCH | PUCCH |
| 507 UE 3 OCC 3 | 1 | 1 | -1 | -1 |
| 504 UE 4 | PUCCH | PUCCH | PUCCH | PUCCH |
| 508 UE 4 OCC 4 | -1 | -1 | 1 | 1 |

FIG.5

METHOD AND DEVICE FOR TRANSMITTING SIGNAL IN WIRELESS COMMUNICATION SYSTEM

CROSS-REFERENCE TO RELATED APPLICATION(S)

This application is a U.S. National Stage application under 35 U.S.C. § 371 of an International application filed on Jul. 15, 2016 and assigned application number PCT/KR2016/007765, which claimed the benefit of U.S. Provisional Applications filed on Jul. 17, 2015 and assigned Ser. No. 62/193,849, filed on Aug. 4, 2015 and assigned Ser. No. 62/200,930, filed on Aug. 20, 2015 and assigned Ser. No. 62/207,619, filed on Oct. 23, 2015 and assigned Ser. No. 62/245,538, the entire disclosure of which is hereby incorporated by reference.

TECHNICAL FIELD

The present disclosure relates to a method and a device for a terminal that may control uplink power to feedback a channel state and enhance coverage in a wireless communication system.

BACKGROUND ART

In order to meet a growing demand for wireless data traffic after commercialization of the 4G communication system, efforts are underway to develop an improved 5G or pre-5G communication system. For this reason, the 5G communication system or the pre-5G communication system is referred to as a system after a 4G network (beyond 4G network) communication system or after a long term evolution (LTE) system (post LTE). In order to achieve a high data rate, the 5G communication system is being considered to be implemented in a microwave (mmWave) band (e.g., 60 gigahertz (60 GHz) band). In order to mitigate a path loss of the radio wave in the microwave band and to increase a propagation distance of the radio wave, in the 5G communication system, beamforming, massive multi-input multi-output (MIMO), full-dimensional MIMO (FD-MIMO), array antenna, analog beamforming, and large scale antenna technologies are being discussed. In addition, in order to improve the network of the system, in the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMP), interference cancellation, and the like have been developed. In addition, in the 5G communication system, hybrid FSK and QAM modulation (FQAM) and sliding window superposition coding (SWSC) which are advanced coding modulation (ACM) schemes, and filter bank multi carrier (FBMC), non-orthogonal multiple access (NOMA), and sparse code multiple access (SCMA) which are advanced connection technologies have been developed.

Meanwhile, the Internet has evolved into an Internet of Things (IoT) network in which information is exchanged and processed among distributed components such as objects in a human-centered connection network in which humans generate and consume information. Internet of Everything (IoE) technology, which combines IoT technology and big data processing technology through connection with cloud servers, is also emerging. In order to implement IoT, technology elements such as sensing technology, wired/wireless communication, network infrastructure, service interface technology, and security technology are required. Thus, in recent years, technologies such as sensor network, machine to machine (M2M), machine type communication (MTC), and the like for connection between objects have been studied. In an IoT environment, intelligent Internet technology (IT) services that collect and analyze data generated from connected objects to create new value in human life can be provided. IoT can be applied to fields such as smart homes, smart buildings, smart cities, smart cars or connected cars, smart grids, health care, smart home appliances, advanced medical services, etc., through convergence and fusion between existing information technology (IT) technology and various industries.

Accordingly, various attempts have been made to apply the 5G communication system to the IoT network. For example, 5G communication technologies such as a sensor network, M2M, MTC, and the like are implemented by techniques such as beamforming, MIMO, array antennas, and the like. The application of cloud RAN as the big data processing technology described above is also an example of the convergence of 5G technology and IoT technology.

Wireless communication systems are not limited to providing an initial voice-oriented service, and are evolving into broadband wireless communication systems that provide high-speed and high-quality packet data services, such as high speed packet access (HSPA), long term evolution (LTE) or evolved universal terrestrial radio access (E-UTRA) of 3rd generation partnership projection (3GPP), high rate packet data (HRPD) and ultra mobile broadband (UMB) of 3GPP2, and communication standards such as IEEE 802.16e.

An LTE system, which is a typical example of the broadband wireless communication system, adopts an orthogonal frequency division multiple access (OFDMA) scheme in a downlink and a single carrier frequency division multiple access (SC-FDMA) scheme in an uplink. In the above-mentioned multiple access scheme, time-frequency resources to transmit data or control information for each user are allocated and operated such that the time-frequency resources do not overlap each other, that is, orthogonality is established, thereby distinguishing the data or the control information for each user.

The LTE system adopts a hybrid automatic repeat request (HARQ) scheme in which a physical layer retransmits corresponding data when decoding fails in an initial transmission. In the HARQ scheme, when a receiver fails to correctly decode data, the receiver transmits information negative acknowledgment (NACK) indicating decoding failure to a transmitter, and the transmitter retransmits corresponding data in the physical layer. The receiver combines data retransmitted by the transmitter with data that has not been decoded previously, thereby improving data reception performance. In addition, when correctly decoding data, the receiver can transmit acknowledgment (ACK) indicating successful decoding to the transmitter so that the transmitter can transmit new data.

In addition, the LTE system adopts a method of allocating resources to user equipment (UE) according to a channel state in order to improve reception performance of a downlink. A base station (BS) transmits a channel state information-reference signal (CSI-RS) to the downlink to allocate resources according to the channel state of the UE. The UE measures channel quality information (CQI) based on the CSI-RS and transmits the CQI to the BS. The BS can allocate an optimal frequency resource to the UE based on the CQI.

The LTE and long term evolution-advanced (LTE-A) systems operating as described above may support low-cost/low-complexity UEs of which some functions are limited. The low-cost UEs are expected to be suitable for MTC or M2M services, which mainly provide services such as remote meter reading, crime prevention, logistics, etc. In addition, a low-cost MTC UE is expected to be a means of realizing cellular-based IoT.

The low-cost MTC UE needs to improve the coverage compared to an existing UE because the low-cost MTC UE can operate in shadow areas or undergrounds of buildings where person cannot reach although it has low mobility according to characteristics of MTC/M2M services or IoT services. Even if the UE is not located in the underground of the building or the shadow area as described above, when the number of antennas of the UE and functions of the UE are limited in order to satisfy requirements such as low-cost and low-complexity, the reception performance deteriorates, so that it may be necessary to improve the coverage to compensate for the deterioration in the reception performance.

Accordingly, there is a need to develop a new technology for a UE requiring coverage enhancement like the low-cost MTC UE.

As described above, existing third generation evolved mobile communication systems such as LTE, UMB, 802.16m, etc., are based on a multi-carrier multiple access scheme. In order to improve transmission efficiency, the third generation evolved mobile communication systems may employ multi-input multi-output (MIMO) and may use various techniques such as beam forming, adaptive modulation and coding (AMC), channel sensitive scheduling, and the like. The above-mentioned various techniques described above may improve the transmission efficiency to improve system capacity performance by concentrating transmission power transmitted from various antennas according to channel quality or the like or adjusting an amount of data to be transmitted, and selectively transmitting data having excellent channel quality to a user. Since most of these techniques operate based on channel state information between an evolved Node B (eNB) or a BS and a UE or a mobile station (MS), it is necessary to measure the channel state between the eNB and the UE. At this time, the above-mentioned CSI-RS is used. The above-mentioned eNB refers to a downlink transmission and uplink reception device located at a certain place, and a single eNB performs transmission and reception for a plurality of cells. In a single mobile communication system, a plurality of eNBs is geographically dispersed, and each eNB performs transmission and reception for a plurality of cells.

The existing third generation and fourth generation mobile communication systems such as LTE/LTE-A utilize MIMO technology for transmitting data using a plurality of transmission/reception antennas in order to increase the data rate and system capacity. The MIMO technology spatially separates and transmits a plurality of information streams by utilizing a plurality of transmission/reception antennas. In this manner, a method of spatially separating and transmitting the plurality of information streams is referred to as spatial multiplexing. In general, to how many information streams spatial multiplexing can be applied depends on the number of antennas of a transmitter and a receiver. Generally, to how many information streams spatial multiplexing can be applied is called a rank of corresponding transmission. The MIMO technology that is supported by standards up to LTE/LTE-A Release 11 supports spatial multiplexing for a case in which the number of transmission and reception antennas is respectively 8, and up to 8 ranks are supported.

Accordingly, there is a need to develop a new technique for a UE and an eNB which transmit and receive a plurality of reference signals in order to use the MIMO technique.

DETAILED DESCRIPTION OF THE INVENTION

Technical Problem

Therefore, the present disclosure has been made in view of the above-mentioned problems, and an aspect of the present disclosure is to provide an efficient transmission power determination method and device for a UE that requires coverage enhancement. In addition, another aspect of the present disclosure is to provide a method and device for preventing deterioration in communication performance due to inter-UE interference when transmission power is changed in successive subframes repeatedly transmitted.

In addition, still another aspect of the present disclosure is to provide a method and device in which a UE measures a reference signal to generate channel state information and transmits the generated channel state information.

Technical Solution

In accordance with an aspect of the present disclosure, there is provided a method of controlling uplink transmission power of a terminal in a wireless communication system, including: initializing a power control adjustment value when a repetition level for a coverage enhancement mode is changed; updating the power control adjustment value according to a transmission power control (TPC) command received from a base station; calculating uplink transmission power based on the updated power control adjustment value and the repetition level; and transmitting uplink data or control information with the calculated uplink transmission power.

In accordance with another aspect of the present disclosure, there is provided a method in which a base station supports uplink transmission power control of a terminal in a wireless communication system, including: transmitting, to the terminal, information on a repetition level for a coverage enhancement mode configured for the terminal; transmitting, to the terminal, a power control adjustment value according to a TPC command for controlling uplink transmission power of the terminal; and receiving, from the terminal, the same data or the same control information during at least two consecutive subframes, wherein the same data or the same control information is transmitted from the terminal using the power control adjustment value updated by the TPC command and the uplink transmission power calculated based on the repetition level.

BRIEF DESCRIPTION OF DRAWINGS

Further aspects, features and advantages of the present disclosure as set forth above in certain preferred embodiments thereof will become more apparent from the following description, taken in conjunction with the accompanying drawings.

FIG. 5 is a diagram illustrating an embodiment in which a UE requiring coverage enhancement transmits PUSCH according to an embodiment of the present disclosure;

Throughout the drawings, it should be noted that like reference numerals are used to illustrate the same or similar elements and features and structures.

MODE FOR CARRYING OUT THE INVENTION

Figure 1:
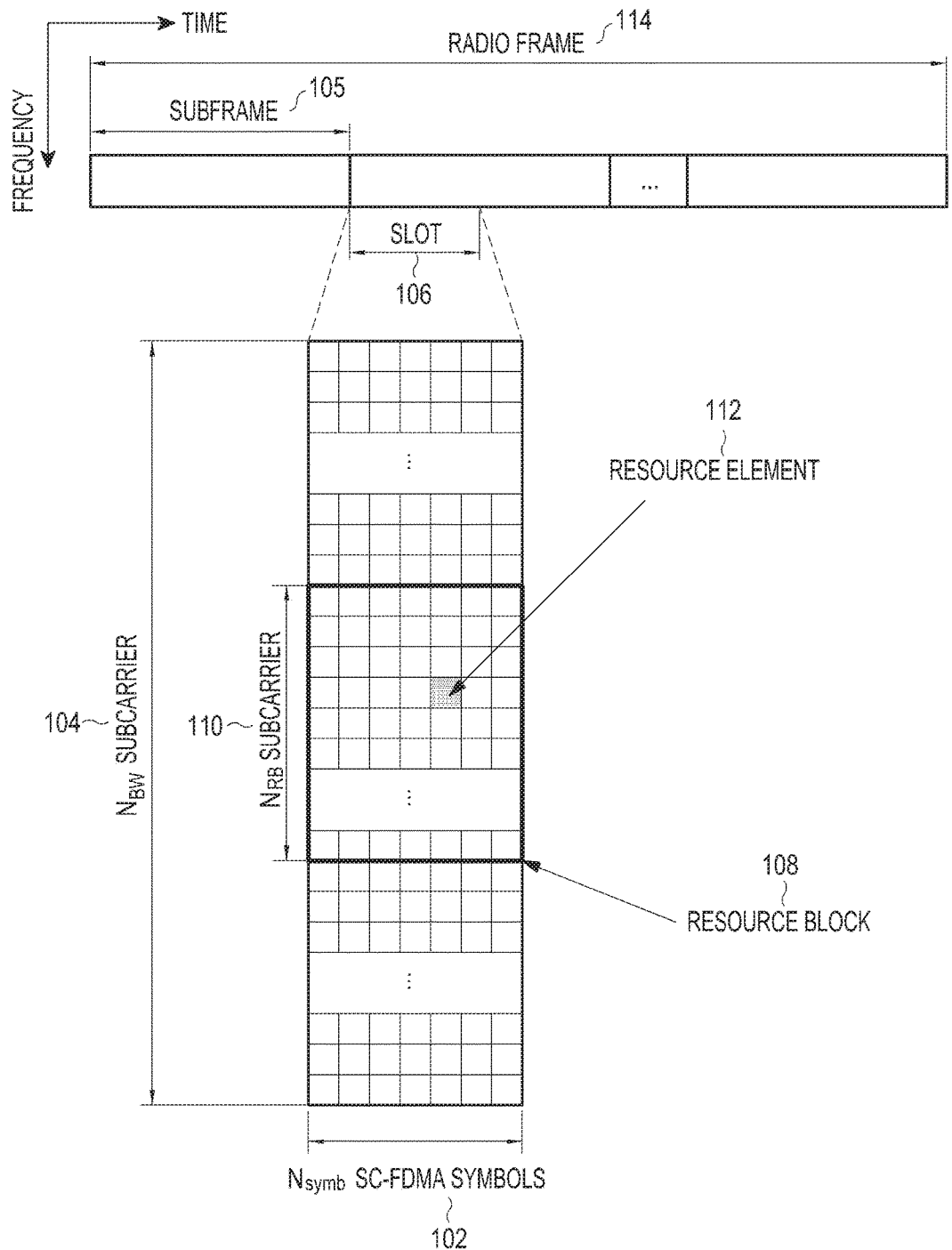
FIG. 1 is a diagram illustrating a basic structure of a wireless resource region in which data or a control channel is transmitted in an uplink of a long term evolution (LTE) system.

Hereinafter, an embodiment of the present disclosure will be described in detail with reference to the accompanying drawings. In the following description of the present disclosure, a detailed description of known functions or configurations incorporated herein will be omitted when it may make the subject matter of the present disclosure rather unclear. The terms as described below are defined in consideration of the functions in the embodiments, and the meaning of the terms may vary according to the intention of a user or operator, convention, or the like. Therefore, the definitions of the terms should be made based on the contents throughout the specification.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block(s). These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" can be either combined into a smaller number of elements or "unit", or further divided into additional elements or "unit". Moreover, the elements and "units" or "modules" may be implemented to reproduce one or more CPUs within a device or a security multimedia card.

In describing the embodiments of the present disclosure in detail, although a particular wireless communication system will be the primary target, it is to be understood that the subject matter to be claimed herein may be applied to other communication systems and services having similar technical backgrounds without departing from the scope of the disclosure herein, and this will be possible at the discretion of the person skilled in the art.

An apparatus and a method provided by an embodiment of the present disclosure can be applied to various communication systems, such as a Long Term Evolution (LTE) mobile communication system, a LTE-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system of 3rd Generation Project Partnership 2 (3GPP2), a Wideband Code Division Multiple Access (WCDMA) mobile communication system 3GPP2, a Code Division Multiple Access (CDMA) mobile communication system of 3GPP2, Institute of an Electrical and Electronics Engineer (EEEE) 802.16m communication system, an Evolved Packet System (EPS), a Mobile Internet Protocol (Mobile IP) system and the like.

In the present disclosure, a base station is an entity that performs resource allocation of a terminal, and may be at least one of an eNode B, a Node B, a base station (BS), a radio access unit, a base station controller, and a node on a network. The terminal may include user equipment (UE), a mobile station (MS), a cellular phone, a smart phone, a computer, or a multimedia system capable of performing communication functions. In the present disclosure, a downlink (DL) is a wireless transmission path of a signal transmitted from a base station to a terminal, and an uplink (UL) is a wireless transmission path of a signal transmitted from a terminal to a base station. In addition, embodiments of the present disclosure will be described below as examples of a long term evolution (LTE) or LTE-advanced (LTE-A) system, but they can be applied to other communication systems having a similar technical background or channel form. In addition, the embodiments of the present disclosure may be also applied to other communication systems through some modifications as far as they do not depart from the scope of the present disclosure at the discretion of the person skilled in the art.

Although some embodiments of the present disclosure are described on the basis of a low-cost MTC UE, it does not exclude that the present disclosure is equally applicable to all general UEs that need coverage enhancement without being limited to the low-cost MTC UE.

FIG. 1 is a diagram illustrating a basic structure of a wireless resource region in which data or a control channel is transmitted in an uplink of an LTE system.

In FIG. 1, the abscissa represents a time domain and the ordinate represents a frequency domain. A minimum transmission unit in the time domain is an SC-FDMA symbol. Here, $N_{symb}$ SC-FDMA symbols 102 constitute one slot 106, and two slots constitute one subframe 105. The length of the slot 106 is 0.5 ms, and the length of the subframe 105 is 1.0 ms. A radio frame 114 is a unit of the time domain composed of 10 subframes. A minimum transmission unit in the frequency domain is a subcarrier, and a bandwidth of a total uplink system transmission bandwidth is composed of a total of NBW subcarriers 104. For reference, N denotes number.

A basic unit of resources in a time-frequency domain is a resource element (hereinafter, referred to as "RE") 112, which can be represented by an SC-FDMA symbol index and a subcarrier index. A resource block (RB or physical resource block (PRB)) 108 is defined as the $N_{symb}$ consecutive SC-FDMA symbols 102 in the time domain and $N_{sc}^{RB}$ consecutive subcarriers 110 in the frequency domain. Accordingly, one RB 108 is composed of $N_{symb} \times N_{sc}^{RB}$ REs. In general, a minimum transmission unit of data is the above-mentioned RB. In the LTE system, $N_{symb}=7$, $N_{sc}^{RB}=12$, and NBW is proportional to a bandwidth of an uplink system transmission band. That is, the number of available RBs $N_{RB}^{UL}$ within a system transmission bandwidth is determined according to the uplink system transmission bandwidth, $N_{BW}=N_{RB}^{UL} \times N_{sc}^{RB}$ is determined. In addition, a data rate increases in proportion to the number of RBs scheduled to a UE. In the LTE system, 6 transmission bandwidths are defined and operated. In a case of a frequency division duplexing (FDD) system in which a downlink and an uplink are divided into frequencies and operated, a downlink transmission bandwidth and an uplink transmission bandwidth may be different from each other. A channel bandwidth represents a radio frequency (RF) bandwidth corresponding to the system transmission bandwidth.

Table 1 shows a correspondence relationship between the number of RBs constituting the system transmission bandwidth defined in the LTE system and the channel bandwidth. For example, in the LTE system having a channel bandwidth of 10 MHz, the system transmission bandwidth is composed of 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration ($N_{RB}$) | 6 | 15 | 25 | 50 | 75 | 100 |

Modulation schemes supported by the LTE system are quadrature phase shift keying (QPSK) modulation, 16 quadrature amplitude modulation (QAM), and 64QAM, and modulation orders (Qm) thereof are 2, 4, and 6. That is, 2 bits per symbol for QPSK modulation, 4 bits per symbol for 16QAM modulation, and 6 bits per symbol for 64QAM modulation may be transmitted.

Figure 2:
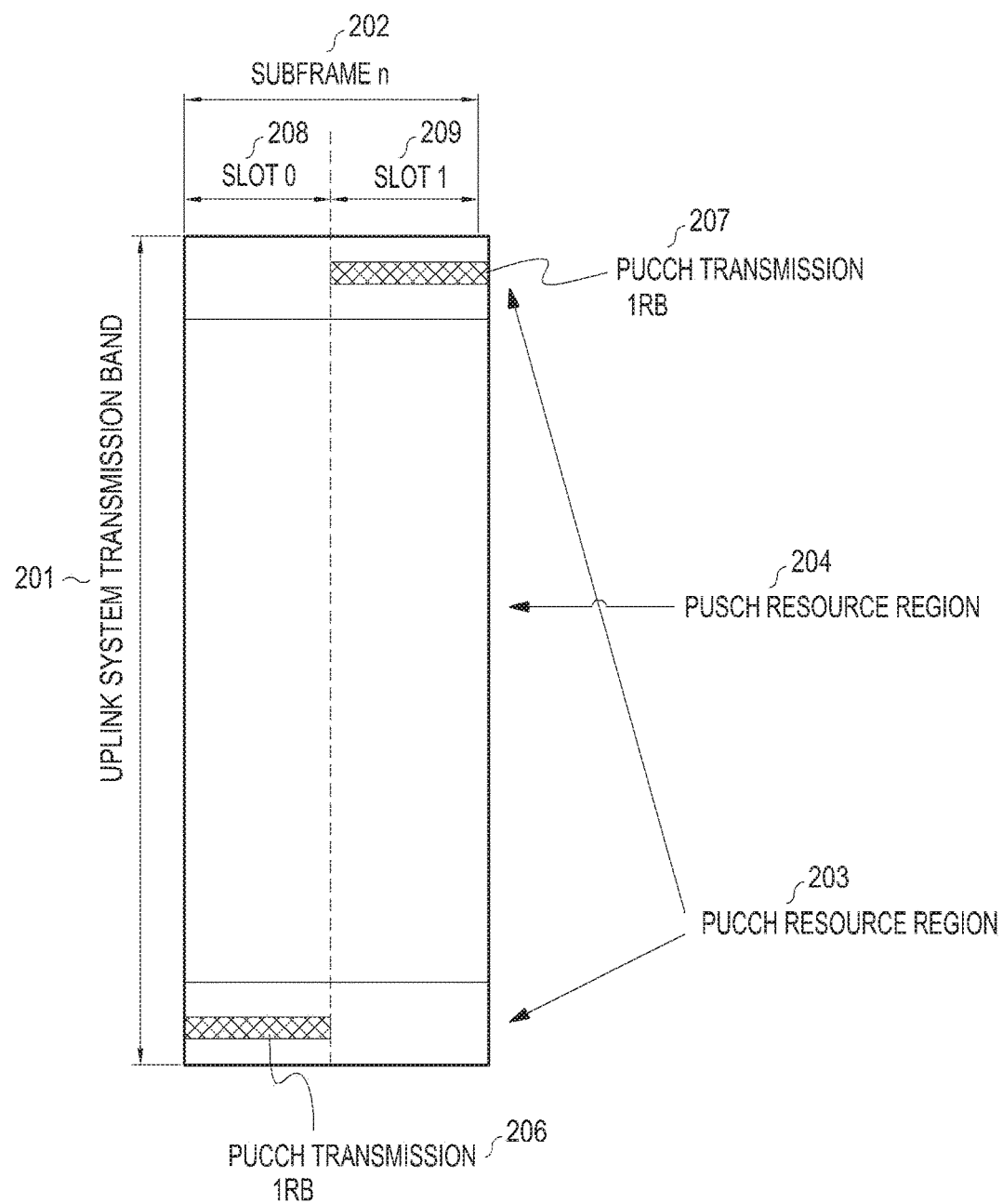
FIG. 2 is a diagram illustrating an example of a data channel and a control channel structure which a UE transmits in an LTE or long term evolution-advanced (LTE-A) system through an uplink system transmission band.

FIG. 2 is a diagram illustrating an example of a data channel and a control channel structure which a UE transmits in an LTE or LTE-A system through an uplink system transmission band.

In FIG. 2, as illustrated, an uplink system transmission band includes a resource region 204 capable of transmitting a physical uplink shared channel (PUSCH) and a resource region 203 capable of transmitting a physical uplink control channel (PUCCH). An eNB may commonly configure the PUSCH resource region 204 and the PUCCH resource region 203 (i.e., cell-specifically) to all UEs within a cell. The PUSCH resource region 204 includes a plurality of resource block sets excluding the PUCCH resource region 203 in the uplink system transmission band. The PUSCH resource region 204 may be used for a UE to transmit data to the eNB.

When the eNB using a frequency division duplex scheme allocates a resource block (RB) in the PUSCH resource region 204 to the UE using a physical downlink control channel (PDCCH) or enhanced-PDCCH (EPDCCH) in a subframe n-4, the UE may transmit data to the eNB using the allocated RB in the PUSCH resource region 204 in a subframe n 202. The PUCCH resource region 203 is composed of a set of a plurality of RBs located at both edges of the uplink system transmission band, and the PUCCH resource region 203 is used for the UE to transmit uplink control information (UCI) to the eNB.

The UE transmits a PUCCH using one RB in the PUCCH resource region 203 according to a predetermined rule, and transmits the PUCCH using different RBs in two slots constituting one subframe in order to obtain a frequency diversity gain. The UE transmits the PUCCH using frequency hopping in units of slots within the subframe transmitting the PUCCH. That is, as illustrated in FIG. 2, the UE transmitting the PUCCH in the subframe n 202 transmits a PUCCH 206 using one RB in the PUCCH resource region 203 located at a lower end in a slot 0 208, and transmits a PUCCH 207 using one RB in the PUCCH resource region 203 located at an upper end in a slot 1 209. At this time, the RBs in the two slots used for the transmission of the PUCCH are located symmetrically with respect to the center of an uplink system transmission band 201.

The UE determines a PUCCH format according to the UCI to be transmitted and transmits the PUCCH using another PRB in the PUCCH resource region 203. The UCI transmitted by the UE using the PUCCH in the LTE system includes HARQ ACK/NACK information according to whether decoding of a physical downlink shared channel is successful, channel quality information (CQI) of a downlink, a scheduling request (SR), and the like.

The LTE and LTE-A systems operating as described above may support low-cost/low-complexity UEs of which some functions are limited. The low-cost UEs are expected to be suitable for machine type communication (MTC) or machine to machine (M2M) services, which mainly provide services such as remote meter reading, crime prevention, logistics, etc. In addition, a low-cost MTC UE is expected to be a means of realizing cellular-based Internet of things (IoT).

In order to realize the low-cost and low-complexity required for the low-cost MTC UE, the cost of an RF element of the low-cost MTC UE can be reduced by limiting the number of reception antennas of the low-cost MTC UE to one, or the cost of a data reception buffer of the low-cost MTC UE can be reduced by limiting an upper limit of a transport block size (TBS) that can be processed by the low-cost MTC UE compared to an existing UE. A typical LTE UE has a function of transmitting and receiving a wideband signal for a minimum bandwidth of 20 MHz regardless of the bandwidth of the system transmission band, whereas the low-cost MTC UE can realize additional low-cost and low-complexity by limiting a maximum bandwidth to less than 20 MHz. For example, the operation of the low-cost MTC UE that supports a channel bandwidth of 1.4 MHz may be defined in an LTE system with a channel bandwidth of 20 MHz.

The low-cost MTC UE needs to improve the coverage compared to the existing UE because the low-cost MTC UE can operate in shadow areas or undergrounds of buildings where person cannot reach although it has low mobility according to characteristics of MTC/M2M services or IoT services. In addition, even if the UE is not located in the underground of the building or the shadow area as described above, when the number of antennas of the UE and functions of the UE are limited in order to satisfy requirements such as low-cost and low-complexity, the reception performance deteriorates, so that it may be necessary to improve the coverage to compensate for the deterioration in the reception performance. For example, since the low-cost MTC UE can receive data only within a narrow band, frequency hopping cannot be performed in a subframe during transmission of a PUCCH or the like, so that frequency diversity cannot be obtained and further coverage enhancement is required. In the present 3 GPP, for example, it is assumed that coverage enhancement up to 15 dB compared with the existing UE is required to secure the coverage of the low-cost MTC UE. In order to satisfy the coverage enhancement, it is considered that the low-cost MTC UE repeatedly transmits or receives a physical channel in several subframes as long as coverage enhancement is required, unlike the existing UE that transmits and receives a physical channel in units of subframes of 1 ms. Here, repetition roughly indicates that the same information is transmitted or received in units of a plurality of subframes. Repetition in this disclosure may include not only repetition of the same physical signal waveform, but also application of the same information to a different physical format, for example, a different HARQ redundancy version (RV), or encoding at a different code rate. A receiver of each of the eNB and the low-cost MTC UE may soft-combine or accumulate the repeatedly transmitted physical channel to obtain more improved coverage than existing coverage.

The eNB may transmit, to the UE, the number of repetitive transmissions of the physical channel required for coverage expansion or improvement using a coverage enhancement level. The eNB may determine the coverage enhancement level according to a report of the UE and a reception state thereof, and may transmit the determined coverage enhancement level to the UE. The coverage enhancement level may be classified into, for example, four levels, and the eNB may determine an appropriate coverage enhancement level according to the condition of the UE and may transmit the determined coverage enhancement level to the UE. Each coverage enhancement level is related to the number of repetitive transmissions of the physical channel so that the UE may determine the number of repetitive transmissions of the physical channel based on the coverage enhancement level. As an example, the coverage enhancement level may be configured for each UE through an upper layer of the eNB, i.e., a radio resource control (RRC) signaling message. Alternatively, the eNB may configure the coverage enhancement level of the UE when dynamically performing PDSCH or PUSCH scheduling through downlink control information (DCI).

Alternatively, the eNB may determine various coverage enhancement modes according to the report of the UE and a reception state thereof, and may configure the determined modes for the UE. For example, the coverage enhancement mode may be defined as follows. A case in which the low-cost MTC UE has similar coverage to that of a general UE so that the repetitive transmissions of the physical channel is not required, or a case in which the low-cost MTC UE requires only a small number of repetitive transmissions to enhance coverage of the physical channel may be defined as a coverage enhancement mode A (CE mode A), and a case in which the low-cost MTC UE requires a large number of repetitive transmissions to enhance the coverage of the physical channel may be defined as a coverage enhancement mode B (CE mode B). The eNB may transmit the CE mode A or the CE mode B to the UE according to the condition of the UE so that the UE may perform an operation according to the CE mode. The UE may perform different operations according to the CE mode configured by the eNB. For example, when a DCI bit size received by the UE varies according to the CE mode, the UE should assume the DCI bit size corresponding to the configured CE mode and attempt blind detection of the DCI.

As described above, the low-cost MTC UE may repeatedly transmit the physical channel to the eNB in the uplink when coverage enhancement is required. A repetition level for repeatedly transmitting the physical channel in the uplink may be configured by the eNB, or may be determined and configured by the low-cost MTC UE by itself. For example, in a case of a random access channel (RACH), the UE may determine a coverage enhancement level for transmitting the RACH based on measured path-loss. On the other hand, in a case of PUCCH or PUSCH, the UE may transmit the PUCCH or the PUSCH according to the coverage enhancement level configured by the eNB. Here, the repetition level may denote the number of subframe repetition transmissions required for the coverage enhancement of the low-cost MTC UE, or may denote a logical index mapped to the number of actually required subframes.

In the present disclosure, embodiments will be described on the basis of the repetition level serving as the logical index mapped to the number of actually required subframes, but a case where the repetition level indicates the number of repetitive transmissions is not excluded from the present disclosure. When configuring the repetition level, the eNB configures the repetition level in a semi-static manner through an RRC signaling message according to the state of the UE, or dynamically configures the repetition level through downlink control information (DCI). In addition, the eNB may transmit a set of predetermined repetition levels to the UE through the RRC signaling message, and may allow the UE to configure an accurate repetition level for PUSCH transmission or PDSCH reception through the DCI. When the UE configures the repetition level by itself, the repetition level may be determined based on a path-loss measurement value with the eNB.

The low-cost MTC UE requiring coverage enhancement generally has a large path-loss, and therefore, when a method of determining uplink transmission power of the existing UE is used in the same manner, the uplink transmission power of the low-cost MTC UE is determined as a maximum transmission power value of the low-cost MTC UE. Accordingly, the low-cost MTC UE transmits the PUSCH or the PUCCH with the maximum transmission power which is available to the low-cost MTC UE. When it is assumed that a degree of coverage enhancement of the low-cost MTC UE considered by the MTC is 15 dB compared to the existing LTE UE and that the maximum transmission power of the low-cost MTC UE is limited to 20 dBm in order to reduce the complexity of the low-cost MTC UE (The maximum transmission power of the UE in case of the existing UE is 23 dBm), the low-cost MTC UE requires a maximum of 18 dB for coverage enhancement.

When the eNB is operating four steps of repetition levels for coverage enhancement of 18 dB (assuming that even a case in which the repetition level is not required is included in the 4 steps), one repetition level should cover 6 dB. In this case, even two UEs having the same repetition level have a different path-loss of up to 6 dB. In other words, even in the low-cost MTC UE having the repetition level, such as when the low-cost MTC UE requiring coverage enhancement always transmits a signal with the maximum transmission power, the power received by the eNB may be different depending on the path-loss with the eNB. When the eNB receives the PUSCH or the PUCCH transmitted by the UEs having the same repetition level, the greater a difference in PUCCH and the PUSCH reception signals between the UEs is, the greater interference of uplink signals between the UEs within a corresponding cell increases.

In addition, the UE requiring coverage enhancement repeatedly transmits the same PUSCH or PUCCH to N subframes by the coverage enhancement required by the UE, and the eNB may achieve coverage enhancement by combining repeatedly received PUSCH or PUCCH during the N subframes. Here, N is the number of repetitive transmissions for which the UE requires coverage enhancement, and has an arbitrary integer value greater than 1. The N may be configured by the eNB for each channel or may be directly determined by the UE. The eNB may also improve the accuracy of channel estimation by combining channel estimation values for every X consecutive subframes among the N subframes transmitting the PUSCH or the PUCCH, thereby maximizing coverage enhancement. Here, X denotes the number of subframes used to combine the channel estimation values, may have an arbitrary integer greater than 1 and less than N, or may be configured by the eNB or may be a previously fixed value. In order for the eNB to combine the channel estimation values in the X consecutive subframes, phase continuity must be maintained within the X consecutive subframes. In order to maintain the phase continuity, the transmission power of the UE or a center frequency should be kept the same during the X consecutive subframes in which the PUSCH or the PUCCH is repeatedly transmitted. When the center frequency or the transmission power of the UE is changed during the subframe in which the PUSCH or the PUCCH is repeatedly transmitted, the channel estimation values cannot be combined in the X consecutive subframes because the phase continuity cannot be ensured. There is a problem that the phase continuity cannot always be ensured since PUSCH or PUCCH transmission power for a current LTE or LTE-A UE may be changed every subframe.

In addition, In a case where a plurality of UEs requiring coverage enhancement repeatedly transmits the PUSCH, when the plurality of UEs uses the same subframe as the same resource block (RB), an orthogonal cover code (OCC) uniquely allocated for each of the plurality of UEs is multiplied for each repeated subframe to maintain orthogonality between the plurality of UEs, thereby multiplexing the PUSCH without interference between the plurality of UEs and transmitting the multiplexed PUSCH to the eNB. When the PUSCH is repeatedly transmitted using the OCC as described above, the transmission power must be the same during the X consecutive subframes in which the UE repeatedly transmits the PUSCH, so that interference between the plurality of UEs does not occur. Here, X is a value corresponding to a length of one OCC, and X UEs can transmit the PUSCH in one RB. However, since the PUSCH transmission power for the current general UE can be changed for each subframe, the orthogonality between the UEs multiplexed in one RB cannot be ensured. When the UE requiring coverage enhancement transmits the PUCCH or the PUSCH according to a conventional uplink transmission power determination method, the UE always uses the maximum transmission power available to the UE, which may cause a problem. When the UE requiring coverage enhancement always transmits a signal with the maximum transmission power, the power received by the eNB may be different depending on the path-loss with the eNB even in the UE having the same repetition level. As a power difference between UEs within the corresponding cell increases, interference of the uplink signals between the UEs increases. In addition, the UE requiring coverage enhancement always uses the maximum transmission power, so that power can be unnecessarily wasted. Therefore, in the embodiments described below, the transmission power is efficiently determined for the UE requiring coverage enhancement in order to solve the above-described problem.

In addition, when the UE requiring coverage enhancement transmits the PUCCH or the PUSCH according to the conventional uplink transmission power determination method, the transmission power may be determined and applied for each subframe, so that there is a possibility that the transmission power is changed for each subframe. However, when the UE repeatedly transmits the PUSCH or the PUCCH in the N subframes and combines the channel estimation values in units of the X consecutive subframes, or when the transmission power of the PUSCH or the PUCCH is changed within the X consecutive subframes, the phase continuity is not ensured so that the performance of channel estimation may be degraded to reduce the coverage. In addition, even in a case where X UEs that transmit the PUSCH are divided into OCCs to improve spectral efficiency while using the same RB and subframe, when the transmission power is changed within the repeatedly transmitted X consecutive subframes, the interference between the UEs may increase. Therefore, in the embodiments to be described later, the transmission power for the UEs requiring coverage enhancement is efficiently determined in order to solve the above-described problem.

Figure 3:
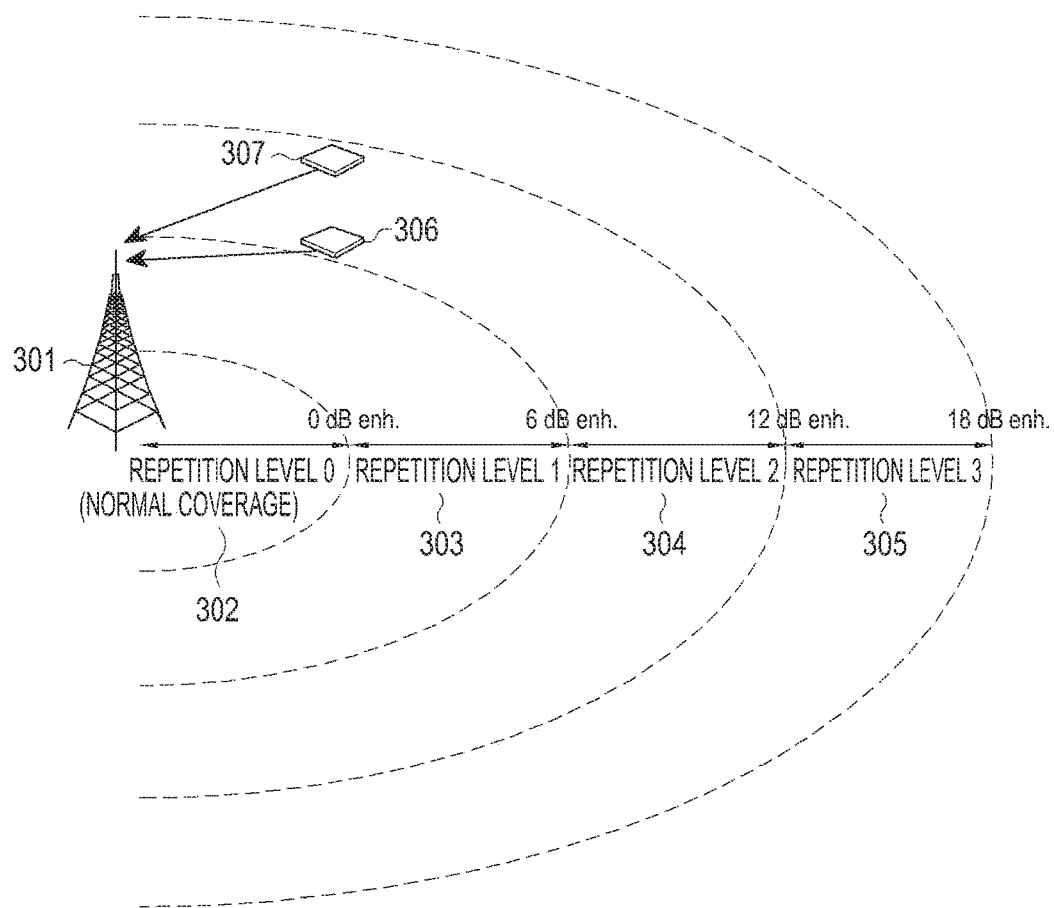
FIG. 3 is a diagram illustrating an embodiment of a method of determining a repetition level for a low-cost MTC UE requiring coverage enhancement.

FIG. 3 is a diagram illustrating an embodiment of a method of determining a repetition level for a low-cost MTC UE requiring coverage enhancement.

In FIG. 3, it is assumed that a low-cost MTC UE secures coverage enhancement of 15 dB compared to an existing UE. Also, it is assumed that the existing UE has maximum transmission power of 23 dBm, whereas the low-cost MTC UE has maximum transmission power of 20 dBm in order to reduce complexity of a transmission terminal. Accordingly, the low-cost MTC UE actually requires coverage enhancement of 18 dB for the purpose of coverage enhancement of 15 dB compared to the existing UE. For example, assuming that the number of repetition levels for coverage enhancement within a cell is configured as "4" (repetition levels 0 to 3), each repetition level may be previously configured to have a spacing of 6 dB for coverage enhancement of 18 dB.

In FIG. 3, the repetition level 0 (302) on the basis of the eNB 301 indicates that the low-cost MTC UE does not need coverage enhancement. The repetition level 0 (302) coverage may be the same as the coverage of the existing UE, but may be smaller than the coverage of the existing UE due to deterioration of reception performance because some functions of the low-cost MTC UE is limited for the purpose of low-cost and low-complexity.

The repetition level 1 (303) indicates that repetitive transmission is required for coverage enhancement from 0 dB up to 6 dB compared to the repetition level 0 (302).

The repetition level 2 (304) indicates that repetitive transmission is required for coverage enhancement from 6 dB up to 12 dB compared to the repetition level 0 (302).

The repetition level 3 (305) indicates that repetitive transmission is required for coverage enhancement from 12 dB up to 18 dB compared to the repetition level 0 (302). Here, although the repetition level is illustrated as being determined according to a degree of coverage enhancement according to a distance, the repetition level and coverage enhancement covered by each repetition level are not necessarily proportional to a distance between the eNB and the UE. That is, when the UE is located in a shadow area or an underground of a building, the required repetition level may be increased due to a large path-loss even though the distance between the eNB and the UE is relatively short.

The repetitive transmissions and repetitive receptions of physical subframes according to the repetition level 1 (303), the repetition level 2 (304), and the repetition level 3 (305) may be previously determined, or the eNB may commonly configure the repetitive transmissions and repetitive receptions of physical subframes for all UEs within the cell. Also, the eNB may configure the repetition level for each UE by measuring reception power of a signal transmitted by the UE according to the path-loss between the UE and the eNB and the condition of the UE, or the UE itself may configure the repetition level based on the path-loss with the eNB. When the eNB configures the repetition level required for the UE, the repetition level may be configured in a semi-static manner using RRC signaling, or the repetition level may be included in DCI to dynamically allocate the repetition level of an uplink or a downlink.

The UE may be aware of the actual number of physical subframe repetition transmissions based on the repetition level determined according to the degree of coverage enhancement of the UE, and may accordingly repeatedly transmit an uplink signal. The UE determines transmission power according to an equation defined according to each channel, and transmits the uplink signal using the determined transmission power.

Equation 1 is a formula for calculating transmission power PPUCCH(i) for an existing UE transmitting a PUCCH to an eNB in an i-th subframe.

$$P_{PUCCH}(i) = \min\left\{ \begin{array}{l} P_{CMAX}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{array} \right\} [dBm]$$

[Equation 1]

Here, $P_{CMAX}(i)$ [dBm] denotes maximum transmission power that the UE can use in the i-th subframe. $P_{0\_PUCCH}$ [dBm] denotes target reception power of the eNB for PUCCH reception, which is configured from an upper layer. $L_C$ [dB] denotes a path-loss between a serving cell c and a UE. $h(n_{CQI}, n_{HARQ}, n_{SR})$ is a value determined according to an information amount of CQI, HARQ-ACK, and SR included in UCI transmitted using a PUCCH. Here, $nc_{QI}$ denotes the number of information bits for CQI, nHARQ denotes the number of bits of the HARQ-ACK, and nsR denotes a value configured for the UE for scheduling request (SR).

$\Delta_{F\_PUCCH}(F)$ denotes an offset configured by the eNB through an upper layer according to a used PUCCH format, $\Delta_{TxD}(F')$ denotes a value that is given through an upper layer when the UE is configured from the upper layer to transmit the PUCCH using two antenna ports and otherwise is given as "0", and g(i) denotes a power control adjustment value that is dynamically compensated according to a closed-loop transmission power control (TPC) command transmitted from the eNB to the UE in the i-th subframe. In a case of a UE that requires coverage enhancement due to a significantly large path-loss PLC, transmission power $P_{PUCCH}(i)$ according to Equation 1 always becomes $P_{CMAX}(i)$. In this case, the low-cost MTC UE may secure the coverage by repeatedly transmitting the PUCCH by insufficient transmission power.

However, when UEs having the same repetition level transmit the PUCCH to the same $P_{CMAX}(i)$, performance degradation due to interference between the UEs within the cell may occur. For example, in first and second UEs 306 and 307 having the same repetition level 2 (304), a difference up to 6 dB in the path-loss may occur depending on the positions of the first and second UEs within a region covered by the repetition level 2 (304). FIG. 3 illustrates a case in which a path-loss of the first UE 306 is smaller by 6 dB than a path-loss of the second UE 307. When the first and second UEs 306 and 307 transmit the PUCCH with the transmission power $P_{CMAX}$ (i) according to Equation 1, the reception power received by the eNB has a difference of 6 dB between the first and second UEs. This is usually referred to as "near-far effect". Since the UE transmitting the PUCCH transmits a signal to the same RB within the same PUCCH resource using code division multiplexing (CDM), the above-mentioned reception power difference or near-far effect may cause intracell interference between the UEs within the cell when the PUCCH is received. Considering that the reception power difference or the near-far effect causes deterioration in performance and the PUCCH is a channel for transmitting ACK/NACK for PDSCH reception, downlink channel state information, or the like, a downlink throughput decreases as a result. In addition, when the same number of repetitive transmissions and the same transmission power are used although the path-loss of the first UE 306 is less by 6 dB than the path-loss of the second UE 307 in FIG. 3, the first UE 306 may cause a waste of 6 dB in terms of power consumption. Therefore, there is a need for a method for minimizing interference between UEs within a cell and efficiently consuming power when the UE requiring coverage enhancement transmits a PUCCH.

First Embodiment

A first embodiment proposes a power control method suitable for a case where a UE that requires coverage enhancement when transmitting a PUCCH repeatedly transmits the PUCCH to at least one subframe. According to Equation 1 for determining the PUCCH transmission power of the existing UE, the UE requiring coverage enhancement always needs to transmit the PUCCH using $P_{CMAX}$ (i). However, in this case, as described above, since the PUCCH is transmitted to the same RB within the cell and the UEs are classified using CDM so that inter-UE interference may occur, and a UE close to the eNB in the same repetition level may unnecessarily waste power. Therefore, a new method for the transmission power for transmitting the PUCCH of the UE that requires coverage enhancement is needed.

In the first embodiment of the present disclosure, a method is proposed in which the UE requiring coverage enhancement determines initial transmission power as a power value in which $P_{CMAX}$ (i) or an offset according to the repetition level in $P_{CMAX}$ (i) is reflected, and then reflects a closed-loop TPC command transmitted by the eNB and dynamically adjusts the result. The following Equation 2 is defined to determine the transmission power for transmitting the PUCCH of the UE requiring coverage enhancement according to the first embodiment of the present disclosure.

$$P_{PUCCH}(i) = \min\left\{ \begin{array}{l} P_{CMAX}(i), \\ P_{CMAX}(i) - \Delta_{RL}(L) + g(i) \end{array} \right\} \quad \text{[Equation 2]}$$

Here, $P_{PUCCH}(i)$ denotes transmission power determined to transmit the PUCCH to the eNB in the i-th subframe, and $\Delta_{RL}(L)$ denotes an offset value according to each repetition level L.

The $\Delta_{RL}(L)$ may be configured by the eNB for UEs within a corresponding cell for each repetition level, or may be configured as a predetermined value for each repetition level by the UEs within the cell. g(i) is a value calculated by a TPC command transmitted from the eNB to the UE for power control of the UE in the i-th subframe. The g(i) may be calculated by accumulating TPC commands (accumulated method), or may be determined to be a recently received value (absolute method). Whether either of the above two manners will be used can be configured by the eNB.

In a case in which the UE performs power control according to the first embodiment of the present disclosure, when the g(i) is calculated in the accumulated method, the following Equation 3 may be used.

$$g(i) = g(i-1) + \sum_{m=0}^{M-1} \delta_{PUCCH}(i - k_m) \quad \text{[Equation 3]}$$

Here, $\delta_{PUCCH}(i)$ denotes a TPC command received from the eNB for closed-loop PUCCH power control in the i-th subframe.

In addition, when the UE calculates g(i) in the absolute method when performing power control according to the first embodiment of the present disclosure, g(i) has a value of the TPC command most recently received from the eNB. The TPC command for the UE transmitting the PUCCH may be included in DCI of M-PDCCH transmitted by the eNB to the UE for PDSCH scheduling. For example, the TPC command $\delta_{PUCCH}(i)$ for PUCCH may be obtained from DCI format 3/3A received using DCI format 1A/1B/1D/1/2A/2/2B/2C/2D or TPC-PUCCH-RNTI which the UE receives using a cell radio network temporary identifier (C-RNTI), but in this disclosure, the UE does not restrict the DCI format from which $\delta_{PUCCH}(i)$ can be obtained. In Equation 3, in a case of frequency division duplex (FDD), M=0 and k0=4, and in a case of time division duplex (TDD), M and km have different values according to TDD UL/DL setting as shown in Table 2.

TABLE 2

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

$\delta_{PUCCH}(i)$ may be composed of 2 bits when used in the absolute method, and may be composed of 1 or 2 bits when used in the accumulated method.

Another method of the first embodiment of the present disclosure is to determine the PUCCH transmission power of the UE requiring coverage enhancement using Equation 4.

$$P_{PUCCH}(i) = \min \begin{Bmatrix} P_{CMAX}(i), \\ P_{0\_PUCCH} + PL_c + h(n_{CQI}, n_{HARQ}, n_{SR}) + \Delta_{F\_PUCCH}(F) + \Delta_{TxD}(F') + g(i) - \Delta_{RL}(L) \end{Bmatrix} [dBm] \quad \text{[Equation 4]}$$

Here, similarly to Equation 2, $\Delta_{RL}(L)$ is an offset value according to each repetition level L, and may be configured for a UE within a cell for each repetition level according to the configuration of the eNB or may be a predetermined value for each repetition level. Also, $\Delta_{RL}(L)$ may be configured differently for each PUCCH format transmitted by the UE.

In addition, the present disclosure according to the first embodiment also proposes a condition in which g(i) is initialized. In the case of the existing UE, when a parameter received from an upper layer is configured as a new value in order to calculate $P_{0\_PUCCH}$, or when the UE receives a random access response (RAR) in a random access procedure, g(i) can be initialized.

In the present disclosure, when the degree of coverage enhancement required by the UE is changed and the eNB newly configures the repetition level for PUCCH transmission for the UE, the UE initializes g(i) to g(0)=0. As another embodiment, even when the UE itself changes the repetition level for PUCCH transmission according to a change in the path-loss, g(i) can be initialized to g(i)=0.

In addition, in the first embodiment, a method of applying power control based on Equation 2 or Equation 4 according to the coverage enhancement mode is proposed. That is, when the eNB configures a coverage enhancement mode A to the UE, the UE may apply power control for PUCCH transmission based on Equation 2 or 4. Alternatively, when the eNB configures the coverage enhancement mode A for the UE, the UE may apply the power control for PUCCH transmission by applying a conventional power control method based on Equation 1. On the other hand, when the eNB configures a coverage enhancement mode B for the UE, the UE may always transmit the PUCCH with the maximum power of the UE without using the power control for PUCCH transmission. Alternatively, when the eNB configures the coverage enhancement mode B for the UE, the UE may transmit the PUCCH with a power value configured by the eNB or determined by the UE according to the implementation, without using the power control for PUCCH transmission.

Figure 4:
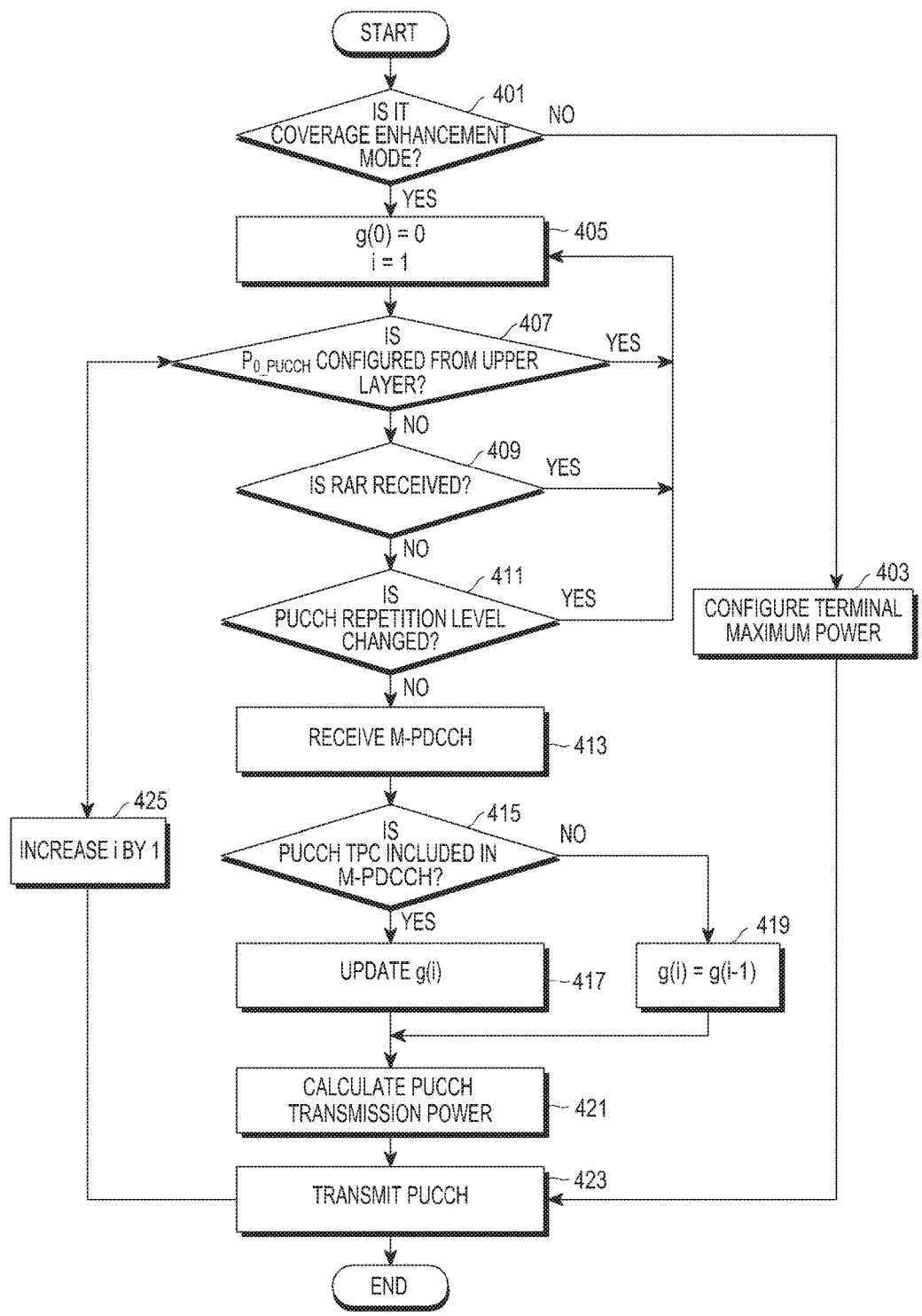
FIG. 4 is a flowchart illustrating a method in which a user equipment (UE) requiring coverage enhancement calculates transmission power required for PUCCH transmission in an i-th subframe according to an embodiment of the present disclosure.

FIG. 4 is a flowchart illustrating a method in which a UE requiring coverage enhancement calculates transmission power required for PUCCH transmission in an i-th subframe according to an embodiment of the present disclosure.

Referring to FIG. 4, in operation 401, a UE determines whether a corresponding coverage enhancement mode is a coverage enhancement mode A to calculate transmission power of an i-th subframe. The coverage enhancement mode A refers to a case where repetitive transmission of a physical channel is not required or only a small number of repetitive transmissions are required to enhance the coverage. The coverage enhancement mode B refers to a case where a large number of repetitive transmissions are required to enhance the coverage of the physical channel. As an example, the UE may identify the coverage enhancement mode configured for the UE by upper layer signaling of an eNB.

In operation 405, when it is determined that the corresponding coverage enhancement mode is the coverage enhancement mode A, the UE initializes g(0) to 0 and i to 1. Here, i denotes an index of a subframe.

In operation 407, the UE determines whether parameters for calculating $P_{0\_PUCCH}$ are configured from the upper layer.

When the parameters for calculating $P_{0\_PUCCH}$ are configured from the upper layer, the UE performs a corresponding procedure again from operation 405. In operation 409, when the parameters for calculating $P_{0\_PUCCH}$ are not configured, the UE confirms whether a random access response (RAR) is received in a random access procedure.

When the UE receives the RAR, the UE performs the corresponding procedure again from operation 405. However, when the UE does not receive the RAR, the UE determines whether a PUCCH repetition level has been changed by the configuration of the eNB or by the determination of the UE in operation 411.

All of operations 407 to 411 are not necessarily performed and may be omitted as necessary.

When the PUCCH repetition level has been changed, the UE performs the corresponding procedure again from operation 405. In operation 413, when the PUCCH repetition level has not been changed, the UE receives a PDCCH for MTC (hereinafter, referred to as M-PDCCH).

In operation 415, the UE determines whether a TPC command for determining PUCCH transmission power of the UE is included in the received M-PDCCH. For example, when the UE is configured to receive a DCI format 1A/1B/1D/1/2A/2/2B/2C/2D using a C-RNTI or to receive a DCI format 3/3A using TPC-PUCCH-RNTI, it may be determined that the received M-PDCCH includes PUCCH TPC $\delta_{PUCCH}(i)$. However, the DCI from which the UE can obtain information on $\delta_{PUCCH}(i)$ is not limited to the above-described format.

In operation 417, when the received M-PDCCH includes the TPC command, the UE updates g(i) based on the TPC command according to a g(i) calculation method (accumulated method or absolute method) of the eNB.

However, in operation 419, when the received M-PDCCH does not include the TPC command, the UE maintains g(i) as a previous value, that is, g(i−1). In other words, the value of g(i) does not change.

In operation 421, the UE calculates the PUCCH transmission power in the coverage enhancement mode using Equation 2.

In operation 423, the UE transmits the PUCCH to the eNB based on the configured repetition level and transmission power.

In operation 403, when the corresponding coverage enhancement mode is not the coverage enhancement mode A in operation 401, the UE determines that the corresponding coverage enhancement mode is the coverage enhancement mode B, and configures the transmission power of the UE as a maximum transmission power value or an arbitrary power value in order to transmit the PUCCH.

In operation 423, the UE transmits the PUCCH as the maximum transmission power value or the arbitrary power value.

In operation 425, the UE moves to operation 407 to calculate the transmission power of an (i+1)-th subframe.

According to the first embodiment of the present disclosure, when UEs which are located within a cell and require coverage enhancement transmit the PUCCH, the eNB may configure, for the UEs within the cell, whether to perform closed-loop transmission power control using the above-proposed TPC command. The eNB may configure, for the UEs within the cell, whether to commonly perform closed-loop transmission power control in the cell. Alternatively, the eNB may configure whether to perform closed-loop transmission power control using MTC-system information block (MTC-SIB) used for transmitting system information to the UEs (or MTC UEs) being in the coverage enhancement mode within the cell. When the eNB configures to allow the UE being in the coverage enhancement mode to perform closed-loop transmission power control through the MTC-SIB, the UE performs DCI decoding, assuming that a TPC command field is included in the DCI in performing decoding on the DCI transmitted for downlink scheduling. For example, when desiring to receive the DCI format 1A/1B/1D/1/2A/2/2B/2C/2D (or DCI format for PDSCH scheduling) using C-RNTI, the UE attempts to perform DCI decoding assuming that the TPC command field is included in the corresponding DCI. Also, when desiring to receive the DCI format 3/3A using TPC-PUCCH-RNTI, the UE attempts to perform DCI decoding assuming that the TPC command is included in the corresponding DCI.

On the other hand, when the eNB configures to prevent the UE being in the coverage enhancement mode from performing closed-loop transmission power control, the UE performs DCI decoding assuming that the TPC field is not included in the DCI in performing decoding on the DCI transmitted for downlink scheduling. For example, when desiring to receive the DCI format 1A/1B/1D/1/2A/2/2B/2C/2D (or DCI format for PDSCH scheduling) using C-RNTI, the UE attempts to perform DCI decoding assuming that the TPC command field is included in the corresponding DCI. Also, when desiring to receive the DCI format 3/3A using TPC-PUCCH-RNTI, the UE assumes that the eNB does not transmit the TPC command through the corresponding DCI.

In addition, according to the first embodiment of the present disclosure, when transmitting the PUCCH to the UE that is located within the cell and requires coverage enhancement, the eNB may determine whether to perform closed-loop transmission power control using the above-proposed TPC command according to the coverage enhancement mode configured for the UE. The eNB may configure the coverage enhancement mode of the UEs within the cell through RRC signaling. When the eNB configures the coverage enhancement mode A for the UE, the UE performs the DCI decoding assuming that the TPC command field is included in the DCI in performing decoding on the DCI transmitted for downlink scheduling. For example, when desiring to receive the DCI format 1A/1B/1D/1/2A/2/2B/2C/2D (or DCI format for PDSCH scheduling) using C-RNTI, the UE attempts to perform DCI decoding assuming that the TPC command field is included in the corresponding DCI. When desiring to receive the DCI format 3/3A using TPC-PUCCH-RNTI, the UE attempts to receive the TPC command assuming that the eNB transmits the TPC command to the UE using the DCI through the coverage enhancement mode A.

On the other hand, when the eNB configures the coverage enhancement mode B for the UE, the UE performs DCI decoding assuming that the TPC field is not included in the DCI in performing decoding on the DCI transmitted for downlink scheduling. For example, when desiring to receive the DCI format 1A/1B/1D/1/2A/2/2B/2C/2D (or DCI format for PDSCH scheduling) using C-RNTI, the UE attempts to perform DCI decoding assuming that the TPC command field is not included in the corresponding DCI. Also, when desiring to receive the DCI format 3/3A using TPC-PUCCH-RNTI, the UE assumes that the UE does not transmit the TPC command through the corresponding DCI.

In addition, when the eNB configures to allow all the UEs within the cell to commonly perform closed-loop transmission power control with respect to whether the power control configured by system information is configured and the coverage enhancement mode configured using RRC signaling for the UE, and when the UE transmitting the PUCCH configures the coverage enhancement mode A, the UE may perform DCI decoding assuming that the TPC command field is included in the DCI in performing decoding on the DCI transmitted for downlink scheduling. In addition, when the DCI format 3/3A using TPC-PUCCH-RNTI is configured, the UE attempts to receive the corresponding DCI assuming that the eNB transmits the corresponding DCI to the UE being in the coverage enhancement mode. Otherwise, the UE attempts to perform DCI decoding assuming that the TPC command field is not included in the corresponding DCI, and assumes that the DCI format 3/3A using the TPC-PUCCH-RNTI is not transmitted to the UE being in the coverage enhancement mode by the eNB.

In the first embodiment, when a plurality of UEs having the same repetition level transmit the PUCCH using the same transmission power $P_{CMAX}(i)$, a power control method is proposed to prevent deterioration in performance due to interference between UEs within the cell. In the case of the PUSCH transmission of the UE requiring coverage enhancement, an RB capable of transmitting the PUSCH is uniquely assigned to each UE, so that interference does not occur between the PUSCH transmitted by a single UE and the PUSCH transmitted by another UE. However, when the PUSCH is repeatedly transmitted over a plurality of subframes to improve the coverage of the PUSCH, the eNB may schedule the UE to transmit the PUSCH in a code division multiple access (CDMA) scheme in the same RB resource in order to improve spectrum efficiency.

FIG. 5 is a diagram illustrating an embodiment in which a UE requiring coverage enhancement transmits PUSCH according to an embodiment of the present disclosure.

In FIG. 5, a UE 1 (501), a UE 2 (502), a UE 3 (503), and a UE 4 (504) use the same RB on a frequency axis and transmit a PUSCH in the same subframe on a time axis. A UE requiring coverage enhancement may repeatedly transmit the PUSCH over a plurality of subframes to satisfy required coverage. In an example of FIG. 5, the UE 1 (501), the UE 2 (502), the UE 3 (503), and the UE 4 (504) transmit the PUSCH to four subframes in order to enhance the coverage. That is, the UE 1 (501), the UE 2 (502), the UE 3 (503), and the UE 4 (504) repeatedly transmit the PUSCH in a subframe (i−1), a subframe (i), a subframe (i+1), and a subframe (i+2) in order to enhance the coverage.

In order to distinguish, for each of the UEs, the PUSCH transmitted in the same RB and the same subframe for spectral efficiency, each UE may multiply the PUSCH transmitted to the subframe by an orthogonal cover code (OCC) and may transmit the result. The OCC is a binary sequence constituting a Walsh-Hadamad code composed of 1 or −1, and thus orthogonality is maintained between the OCCs. In FIG. 5, the UE 1 (501), the UE 2 (502), the UE 3 (503), and the UE 4 (504) have different an OCC 1 (505), an OCC 2 (506), an OCC 3 (507), and an OCC 4 (508) which are orthogonal to each other, and the eNB allocates a unique OCC to each of the UEs to maintain orthogonality between the UEs using the same time and the same frequency resource. The UEs 501, 502, 503, and 504 multiply the PUSCH repeatedly transmitted to a plurality of subframes by each OCC allocated from the eNB and transmit the result. For example, in the case of the UE 2 (502), since the OCC 2 (506) allocated by the UE 2 (502) from the eNB is 1, −1, 1, −1, the UE 2 (502) multiplies a PUSCH to be transmitted in the subframe (i−1) by 1 to transmit the result, multiplies a PUSCH to be transmitted in the subframe (i) by −1 to transmit the result, multiplies a PUSCH to be transmitted in the subframe (i+1) by 1 to transmit the result, and then multiplies a PUSCH to be transmitted in the subframe (i+2) by −1 to transmit the result. The UEs using the same time and same frequency resources multiply the PUSCH by the allocated OCC for each subframe in the same manner using the OCCs allocated by the UEs, and transmit the result.

The eNB receives the PUSCHs of the UEs, and multiplies the PUSCH transmitted over the plurality of subframes by the OCC used by the UE desiring to receive the PUSCH for each subframe before combining the PUSCH, and then performs combining. The eNB may receive the PUSCH of the corresponding UE without influence of the PUSCH of other UEs transmitted at the same time and the same frequency resource, in the absence of a near-far effect. That is, even if the plurality of UEs transmits the PUSCH at the same time and the same frequency resource, interference does not occur between the UEs.

However, as described above, in a case in which the plurality of UEs divide the PUSCH repeatedly transmitted in the plurality of subframes for enhancing coverage into the OCCs using the same time and frequency resources, when the near-far effect is large, the interference between the UEs may increase. Accordingly, even in the PUSCH transmission of the UEs requiring coverage enhancement, there is a need for a method in which the plurality of UEs use the same time and same frequency resources to increase the spectral efficiency, divide PUSCH signals between the UEs into the OCCs, and minimize the interference between the UEs and make power consumption efficient.

Second Embodiment

The second embodiment according to the present disclosure is a power control method suitable for a case where a UE needs to enhance coverage in transmitting a PUSCH and thus repeatedly transmits the PUSCH in one or more subframes. In particular, the second embodiment according to the present disclosure is a power control method suitable for a case where a plurality of UEs repeatedly transmit a PUSCH using the same time and same frequency resource and the eNB distinguishes the PUSCH between the plurality of UEs using OCC. However, the second embodiment of the present disclosure is not applicable only when the PUSCH between UEs is distinguished using the OCC.

The PUSCH transmission power of existing LTE and LTE-A UEs is determined using Equation 5.

$$P_{PUSCH}(i) = \min\begin{Bmatrix} P_{CMAX}(i), \\ 10\log_{10}(M_{PUSCH}(i)) + P_{O\_PUSCH}(j) + \alpha_c(j) \cdot PL_c + \Delta_{TF}(i) + f(i) \end{Bmatrix} \quad \text{[Equation 5]}$$

Here, $P_{CMAX}(i)$[dBm] denotes maximum transmission power that the UE can use in an i-th subframe. $P_{O\_PUSCH}$ [dBm] denotes a target reception power of the eNB for PUSCH reception, which is configured from an upper layer. $M_{PUSCH}(i)$ denotes the number of RBs allocated for PUSCH transmission. $PL_C$[dB] denotes a path-loss between a serving cell c and a UE, $\alpha_C(j)$ denotes a value configured by the eNB, and j denotes a value determined according to whether a resource allocation method of the PUSCH corresponds to semi-persistent grant, dynamic scheduled grant, or random access response grant. $\Delta_{TF}(i)$ denotes a value configured by the eNB according to MCS used to transmit the PUSCH. f(i) denotes a power value dynamically compensated according to a closed-loop TPC command transmitted from the eNB to the UE. Exact description of each parameter refers to 3GPP LTE specification TS36.213.

Referring to Equation 5, in the case of the UE requiring coverage enhancement in the same manner as in the PUCCH transmission, a path-loss $PL_C$ is significantly large so that the transmission power $P_{PUSCH}(i)$ is always limited to $P_{CMAX}(i)$. Accordingly, the UE requiring coverage enhancement may secure coverage through repetitive transmission by insufficient transmission power. However, when the UE requiring coverage enhancement always transmits the PUSCH using $P_{CMAX}(i)$, interference may occur between UEs transmitting the PUSCH to the same RB within the cell as described above. In addition, in the UEs having the same repetition level, the UE close to the eNB wastes unnecessary power. Accordingly, there is proposed a method in which the eNB adjusts and determines $P_{CMAX}(i)$ according to the closed-loop TPC command transmitted for the power control of the UE requiring coverage enhancement.

Equation 6 is an equation that defines a method of determining the PUSCH transmission power of the UE according to the second embodiment of the present disclosure.

$$P_{PUSCH}(i) = \begin{Bmatrix} P_{CMAX}(i), \\ P_{CMAX}(i) - \Delta_{RL}(L) + f(i) \end{Bmatrix} \quad \text{[Equation 6]}$$

Here, $P_{PUSCH}(i)$ denotes transmission power of the PUSCH determined in an i-th subframe, $\Delta_{RL}(L)$ denotes an offset value according to each repetition level L. f(i) denotes a value determined according to a TPC command dynamically transmitted to the UE from the eNB for the power control of the UE.

$\Delta_{RL}(L)$ denotes a value that is previously configured for a UE within a cell for each repetition level according to the configuration of the eNB, or a predefined fixed value. When the eNB uses an absolute TPC command, f(i) applies a power control value indicated by the TPC command. When the eNB uses an accumulated TPC command, f(i) may be calculated as a value accumulated in the i-th subframe by the TPC command transmitted from the eNB to the corresponding UE as shown in Equation 7.

$$f(i) = f(i-1) + \delta_{PUSCH}(i - K_{PUSCH}) \quad \text{[Equation 7]}$$

Here, $\delta_{PUSCH}(i)$ denotes a TPC command received from the eNB for closed-loop PUCCH power control in an i-th subframe. The TPC command for the UE may be included in a DCI of an M-PDCCH that the eNB transmits to the UE for PUSCH scheduling. For example, the UE may obtain TPC command information $\delta_{PUSCH}(i)$ for the PUSCH in a DCI format 0 received using C-RNTI or a DCI format 3/3A received using TPC-PUCCH-RNTI, but in the present disclosure, the UE does not restrict the DCI format from which $\delta_{PUCCH}(i)$ can be obtained.

Another method of the second embodiment of this disclosure is to determine the PUSCH transmission power of the UE requiring coverage enhancement using Equation 8.

$$P_{PUSCH}(i) = \min \begin{Bmatrix} P_{CMAX}(i), \\ 10\log_{10}(M_{PUSCH}(i)) + P_{0\_PUSCH}(j) + \alpha_c(j) \cdot PL_c + \Delta_{TF}(i) + f(i) - \Delta_{RL}(L) \end{Bmatrix} \quad \text{[Equation 8]}$$

Here, $\Delta_{RL}(L)$ denotes an offset value according to each repetition level L in the same manner as in Equation 6, and may be configured for the UE within the cell for each repetition level according to the configuration of the eNB or configured as a predetermined value for each repetition level. In addition, $\Delta_{RL}(L)$ for PUSCH and PUCCH transmission may be configured differently from each other.

In the present disclosure, there is proposed a condition in which f(i) is initialized when f(i) operates in the accumulated method. In the case of the existing UE, when $P_{0\_PUSCH}$ is configured as a new value from an upper layer, f(i) may be initialized to 0 dB. Alternatively, when the UE receives a RAR in the random access procedure, the eNB may initialize f(i) to an arbitrary value based on the RAR and predetermined system information.

In addition, in the second embodiment of the present disclosure, it is proposed that f(i) is initialized to 0 when a degree of coverage enhancement required by the UE is changed so that the eNB newly configures a repetition level for PUSCH transmission for the UE. Alternatively, when the UE itself changes the repetition level for the PUSCH transmission according to a change in the path-loss, f(i) is initialized to 0.

Figure 6:
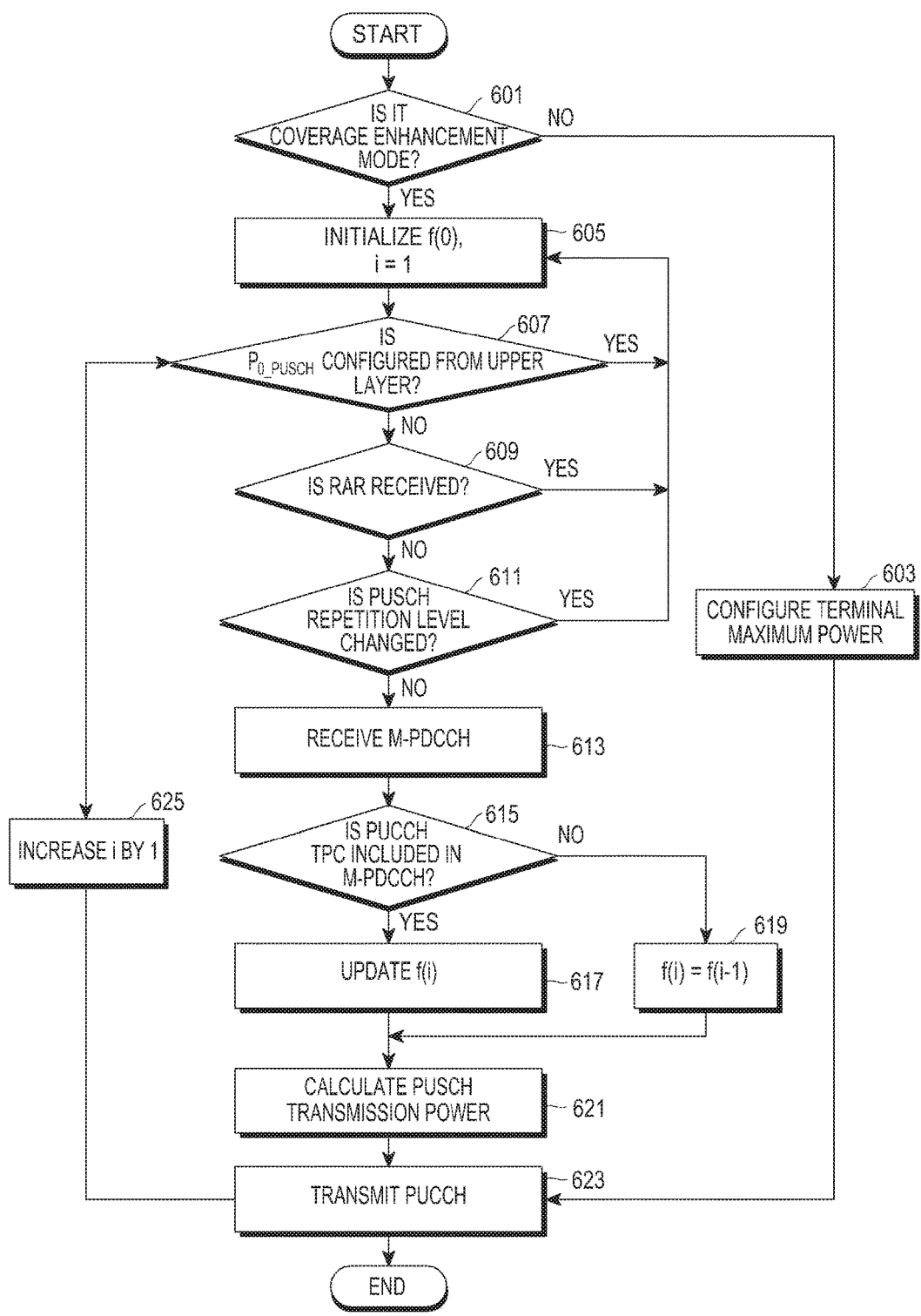
FIG. 6 is a flowchart illustrating a method in which a UE requiring coverage enhancement calculates transmission power required for PUSCH transmission according to an embodiment of the present disclosure.

FIG. 6 is a flowchart illustrating a method in which a UE requiring coverage enhancement calculates transmission power required for PUSCH transmission according to an embodiment of the present disclosure.

Referring to FIG. 6, in operation 601, the UE confirm whether a corresponding coverage enhancement mode is a coverage enhancement mode A or B. It is assumed that the coverage enhancement mode is divided into a coverage enhancement mode A and a coverage enhancement mode B as shown in FIG. 4. The coverage enhancement mode A is defined as a case in which repetitive transmission of a physical channel is not required or only a small number of repetitive transmissions are required to enhance coverage. The coverage enhancement mode B is defined as a case in which a large number of repetitive transmissions are required to enhance the coverage of the physical channel.

In operation 605, when it is determined that the corresponding coverage enhancement mode is the coverage enhancement mode A, the UE initializes f(0) to 0 and i to 1. Here, i denotes an index of a subframe.

In operation 607, the UE determines whether $P_{0\_PUSCH}$ is configured from the upper layer.

When $P_{0\_PUSCH}$ is newly configured from the upper layer, the UE performs a corresponding procedure again from operation 605. However, when $P_{0\_PUCCH}$ is not configured, the UE determines whether a RAR is received in a random access procedure in operation 609.

When the UE receives the RAR, the UE performs the corresponding procedure again from operation 605. However, when the UE does not receive the RAR, the UE determines whether a PUCCH repetition level has been changed by the configuration of the eNB or by the determination of the UE in operation 611.

All of operations 607 to 611 are not necessarily performed and operations 607 to 611 may be omitted as necessary.

When the PUCCH repetition level has been changed, the UE performs the corresponding procedure again from operation 605. In operation 613, when the PUCCH repetition level has not been changed, the UE receives an M-PDCCH (PDCCH for MTC).

In operation 615, the UE determines whether a TPC command for determining PUCCH transmission power of the UE is included in the received M-PDCCH. When the UE receives a DCI format 0 using a C-RNTI or receives a DCI format 3/3A using TPC-PUCCH-RNTI, it may be determined that the received M-PDCCH includes PUCCH TPC $\delta_{PUCCH}(i)$. However, in the present disclosure, the DCI from which the UE can obtain information on $\delta_{PUCCH}(i)$ is not limited only to the above-described DCI format.

In operation 617, when the received M-PDCCH includes the TPC command for determining PUSCH transmission power of the UE, the UE updates f(i) according to Equation 3.

In operation 619, when the received M-PDCCH does not include the TPC command for determining PUSCH transmission power of the UE, the UE maintains f(i) as a current value.

In operation 621, the UE calculates the PUCCH transmission power in the coverage enhancement mode using Equation 6.

In operation 623, the UE transmits the PUCCH to the eNB based on the configured repetition level and transmission power.

In operation 603, when the determined coverage enhancement mode is the coverage enhancement mode B in operation 601, the UE configures the transmission power of the UE as a maximum transmission power value or a predetermined arbitrary power value in order to transmit the PUCCH. When transmitting the PUSCH to the UE that is located within the cell and requires coverage enhancement, the eNB may configure, for the UE, whether to perform closed-loop transmission power control using the above-proposed TPC command. Alternatively, the eNB may configure, for the UE within the cell, whether to commonly perform closed-loop transmission power control in the cell. In this case, the eNB may configure whether to perform closed-loop transmission power control using MTC-SIB used for transmitting system information to the UE within the cell. When the eNB configures to allow the UE being in the coverage enhancement mode to perform closed-loop transmission power control through the MTC-SIB, the UE performs DCI decoding, assuming that a TPC command field is included in the DCI in performing decoding on the DCI transmitted for uplink scheduling. For example, when desiring to receive the DCI format 0 (or DCI format for PDSCH scheduling) using C-RNTI, the UE attempts to perform DCI decoding, assuming that the TPC command field is present. Selectively, when desiring to receive the DCI format 3/3A using TPC-PUCCH-RNTI, the UE attempts to receive a corresponding DCI assuming that the eNB transmits the corresponding DCI to the UE.

On the other hand, when the eNB configures to prevent the UE being in the coverage enhancement mode from performing closed-loop transmission power control, the UE performs DCI decoding assuming that the TPC field is not included in the DCI in performing decoding on the DCI transmitted for uplink scheduling. For example, when desiring to receive the DCI format 0 (or DCI format for PUSCH scheduling) using C-RNTI, the UE attempts to perform DCI decoding assuming that the TPC command field is not included in the corresponding DCI. Also, when desiring to receive the DCI format 3/3A using TPC-PUCCH-RNTI, the UE assumes that the eNB does not transmit the TPC command.

In addition, according to the second embodiment of the present disclosure, the eNB may determine whether to perform closed-loop transmission power control using the TPC command according to the coverage enhancement mode configured for the UE. The eNB may configure the coverage enhancement mode through RRC signaling for the UE within the cell. When the eNB configures the coverage enhancement mode A for the UE, the UE performs the DCI decoding assuming that the TPC command field is included in the DCI in performing decoding on the DCI transmitted for uplink scheduling. For example, when desiring to receive the DCI format 0 (or DCI format for PUSCH scheduling) using C-RNTI, the UE attempts to perform DCI decoding assuming that the TPC command field is present. When desiring to receive the DCI format 3/3A using TPC-PUCCH-RNTI, the UE attempts to receive the corresponding DCI assuming that the eNB transmits the corresponding DCI to the UE being in the coverage enhancement mode A.

On the other hand, when the eNB configures the coverage enhancement mode B for the UE, the UE performs DCI decoding assuming that the TPC field is not included in the DCI in performing decoding on the DCI transmitted for uplink scheduling. For example, when desiring to receive the DCI format 0 (or DCI format for PUSCH scheduling) using C-RNTI, the UE attempts to perform DCI decoding assuming that the TPC command field is not included in the corresponding DCI. Also, when desiring to receive the DCI format 3/3A using TPC-PUCCH-RNTI, the UE assumes that the eNB does not transmit the TPC command to the UE.

In addition, only when the eNB configures to allow all the UEs within the cell to commonly perform closed-loop transmission power control with respect to whether the power control configured by system information is configured and the coverage enhancement mode configured using RRC signaling for the UE, and when the UE transmitting the PUSCH configures the coverage enhancement mode A, the UE may perform DCI decoding assuming that the TPC command field is included in the DCI in performing decoding on the DCI transmitted for uplink scheduling. Otherwise, the UE attempts to perform DCI decoding assuming that the TPC command field is not included in the corresponding DCI. Also, when desiring to receive the DCI format 3/3A using TPC-PUCCH-RNTI, the UE assumes that the eNB does not transmit the TPC command to the UE.

Third Embodiment

In the third embodiment of the present disclosure, when a UE repeatedly transmits a PUSCH or a PUCCH over N subframes to enhance the coverage, a method of adjusting power control within repeatedly transmitted subframe is proposed.

Figure 7:
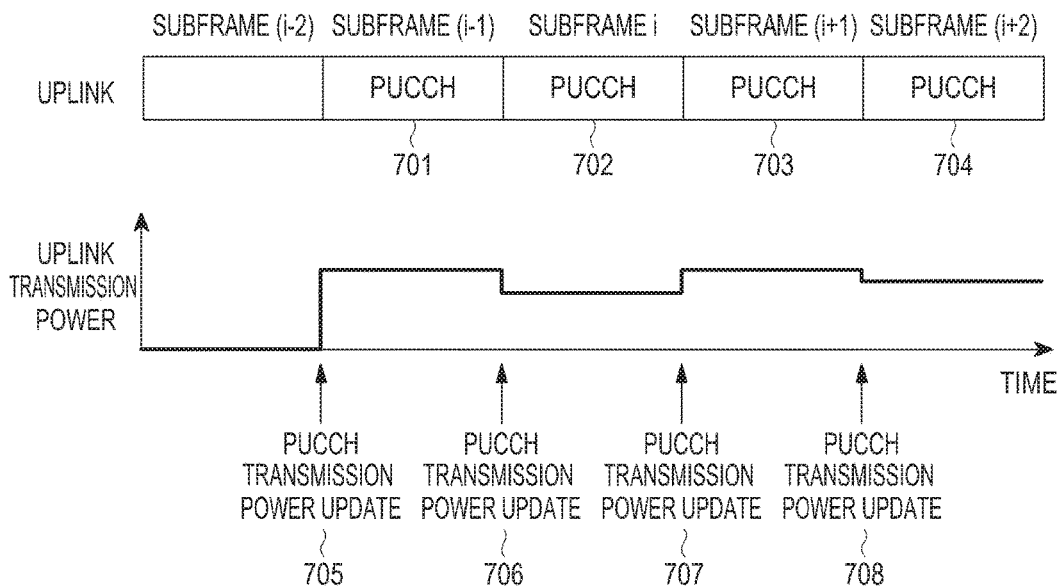
FIG. 7 is a diagram illustrating a time point when a UE calculates and applies transmission power for transmitting a PUCCH when transmitting the PUCCH in an LTE system and a change in the transmission power for each subframe.

FIG. 7 is a diagram illustrating a time point when a UE calculates and applies transmission power for transmitting a PUCCH when transmitting the PUCCH in an LTE system and a change in the transmission power for each subframe.

Referring to FIG. 7, of a plurality of subframes constituting an uplink, a UE may transmit ACK/NACK for different downlink PDSCHs in a predetermined number of subframes 701, 702, 703, and 704 (assumed to be 4 in this case, N=4) using different PUCCHs. According to Equation 1, since the PUCCH transmission power of the UE can be calculated in units of subframes, the PUCCH transmission power of the subframe transmitting the PUCCH may differ for each subframe. In FIG. 7, the UE may calculate transmission power for transmitting the PUCCH before transmitting the PUCCH in the four subframes 701, 702, 703, and 704, and may apply the transmission power according to start time points 705, 706, 707, and 708 of the subframe transmitting the PUCCH. Accordingly, each subframe transmitting the PUCCH may have different transmission power.

In FIG. 7, the PUCCH transmission has been described as an embodiment, but in a case of PUSCH transmission, a UE calculates the PUSCH transmission power prior to all the subframes transmitting the PUSCH, and applies the corresponding power to the subframe in which the PUSCH is transmitted. Accordingly, each subframe transmitting the PUCCH may have different transmission power.

However, when the PUCCH or PUSCH transmission power is newly updated in units of subframes as described above, a transient time is required until stabilization is achieved with desired transmission power from the time point of updating the transmission power. Accordingly, when the transient time becomes long, orthogonality between subcarriers may be broken in an SC-FDMA symbol, which may degrade the reception performance.

The transient time may cause phase discontinuity in successive subframes. As described above, when phase discontinuity occurs in X subframes for combining of channel estimation among the N subframes in which the UE repeatedly transmits a PUSCH or a PUCCH in order to enhance coverage, the eNB cannot perform coherent combining of a channel estimation value, so that the coverage of the UE may be reduced.

In addition, in a case where a plurality of UEs requiring coverage enhancement repeatedly transmits a PUSCH using the same RB and the same subframe and uses an OCC uniquely allocated for each of the plurality of UEs, when the transmission power is changed within the repeated subframe although the plurality of UEs is divided by the OCC, interference may occur between the plurality of UEs because orthogonality between the plurality of UEs is not maintained.

Hereinafter, when the UE requiring coverage enhancement repeatedly transmits the PUSCH or the PUCCH, embodiments in which the same transmission power is maintained while the PUCCH or the PUSCH is repeatedly transmitted will be described.

Figure 8:
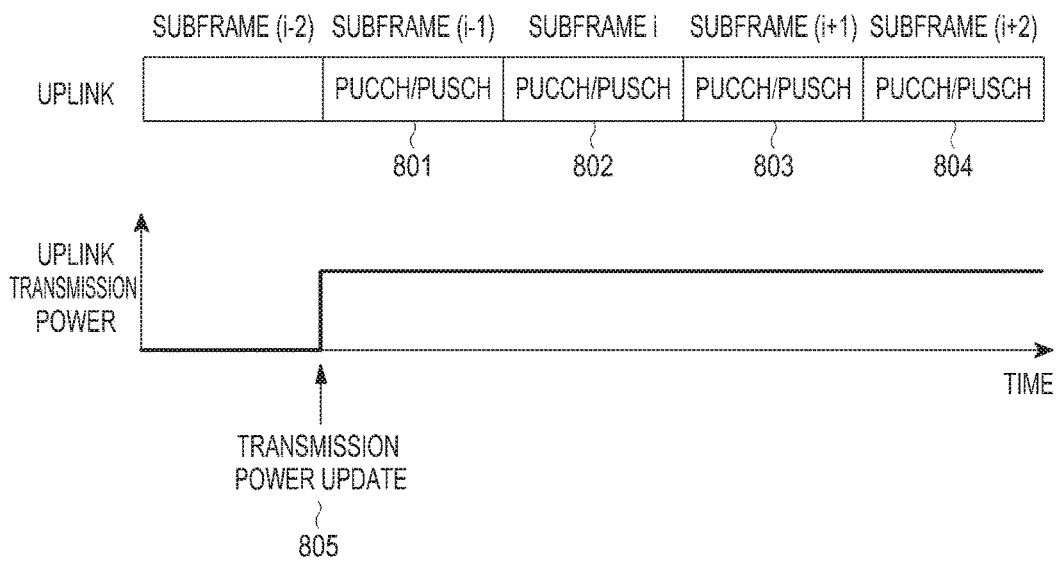
FIG. 8 is a diagram illustrating PUSCH or PUCCH transmission power application of a UE according to an embodiment of the present disclosure.

FIG. 8 is a diagram illustrating PUSCH or PUCCH transmission power application of a UE according to an embodiment of the present disclosure.

Referring to FIG. 8, a UE requiring coverage enhancement may repeatedly transmit a PUSCH or a PUCCH to a plurality of (Here, N=4 as an example) subframes 801, 802, 803, and 804. The UE may calculate a power transmission value of the PUSCH or the PUCCH before the transmission of a first subframe 801 starts among the plurality of subframes for transmitting the PUSCH or the PUCCH, and may maintain the same transmission power in all the subframes 801, 802, 803, and 804 to which the calculated power transmission value is repeatedly transmitted according to a repetition level. That is, when the UE transmitting the PUSCH or the PUCCH needs repetitive transmission during N subframes to enhance coverage, a method in which the UE maintains the same transmission power during the N subframes is proposed.

When transmitting the PUCCH, the UE requiring coverage enhancement may calculate the PUCCH transmission power according to Equation 1, Equation 2, or Equation 4, or may use a previously fixed value without calculating the transmission power of the PUCCH. (i) of $P_{PUCCH}(i)$ denotes an index of each subframe among the N subframes for PUCCH transmission, and $P_{PUCCH}(i)$ is maintained during the N subframes. In addition, when the UE requiring coverage enhancement transmits the PUSCH, the transmission power may be calculated according to Equation 5 or Equation 6, or a previously fixed value may be used without calculating the transmission power of the PUSCH. (i) of $P_{PUSCH}(i)$ denotes an index of each subframe among the N subframes for PUSCH transmission, and $P_{PUSCH}(i)$ is maintained during the N subframes.

In a case in which the UE transmitting the PUSCH or the PUCCH receives a TPC command from the eNB during the N subframes, when accumulated closed-loop power transmission control is performed, all TPCs received during the N subframes are accumulated and applied to transmission power control of a first subframe among next N subframes. Alternatively, when the UE receives the TPC command from the eNB during the N subframes, the TPC command is applied to transmission power control of a first subframe among the next N subframes using the latest received TPC among the TPCs received during the N subframes regardless of the accumulated closed-loop power transmission control or absolute closed-loop power transmission control.

Since the transmission power of $P_{PUSCH}(i)$ or $P_{PUCCH}(i)$ in the UE requiring coverage enhancement for transmitting the PUSCH or PUCCH is limited to $P_{CMAX}(i)$, the fact that $P_{PUSCH}(i)$ or $P_{PUCCH}(i)$ is equally maintained during the N subframes includes the fact that $P_{CMAX}(i)$ is equally maintained during the N subframes. Based on the fact that the UE requiring coverage enhancement for transmitting the PUSCH or PUCCH maintains the same power during the N subframes, it is also possible for the UE to operate differently according to the coverage enhancement mode. For example, in the coverage enhancement mode A, it may be possible to change the transmission power for each subframe transmission that needs to be repeated, but in the coverage enhancement mode B, the same power may need to be used in all the subframes that need to be repeated.

Figure 9:
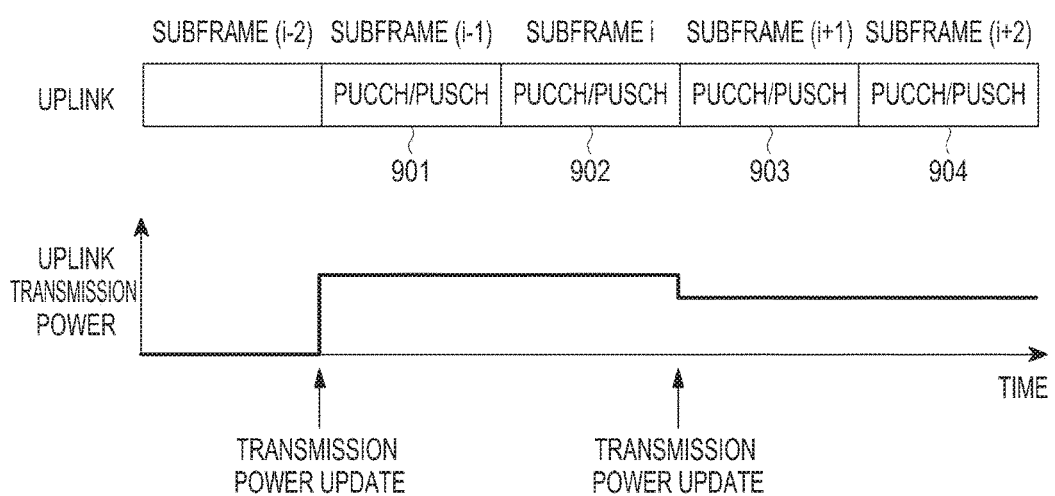
FIG. 9 is a diagram illustrating PUCCH or PUSCH transmission power application of a UE according to an embodiment of the present disclosure.

FIG. 9 is a diagram illustrating PUCCH or PUSCH transmission power application of a UE in a coverage enhancement mode according to an embodiment of the present disclosure.

Referring to FIG. 9, a UE requiring coverage enhancement may configure transmission power to be the same in a subframe required for N repetitive transmissions to transmit a PUSCH or a PUCCH. In the case in which the UE requiring the coverage enhancement repeatedly transmits the PUCCH or the PUSCH, a method in which frequency hopping is performed for every X subframes in order to simultaneously obtain frequency diversity and channel estimation combining may be applied. That is, when the UE needs a total of N repetitive transmissions of the PUSCH or the PUCCH to enhance the coverage, the UE may repeatedly transmit the PUSCH or the PUCCH in the same RB of an arbitrary narrow band during the X consecutive subframes, and then may repeatedly transmit the PUSCH or the PUCCH during the X consecutive subframes by performing frequency hoping to another narrow band. At this time, a relationship of N>X is achieved. When frequency hopping is performed after the PUSCH or the PUCCH is repeatedly transmitted in the X consecutive subframes, a method of maintaining the same transmission power during the X consecutive subframes transmitted in the RB of the same narrow band will be described.

In FIG. 9, the UE requiring coverage enhancement may repeatedly transmit the PUSCH or the PUCCH in a plurality of subframes 901, 902, 903, and 904 (Here, N=4 as an example). The UE may transmit the PUSCH or the PUCCH during the two subframes 901 and 902 corresponding to X=2, and may transmit the PUCCH or the PUSCH using the same RB in the two subframes 903 and 904 corresponding to X=2 by performing frequency hopping 905 to another narrow band. In FIG. 9, a hardware retuning time according to the frequency hopping 905 is not shown, but when a retuning time is required depending on the UE, a time required for RF retuning may be included between the subframe 902 and the subframe 903 in units of a plurality of subframes.

In the third embodiment of the present disclosure, for example, when the UE repeatedly transmits the PUSCH or the PUCCH in the N subframes to enhance coverage in the PUSCH or PUCCH transmission and performs frequency hopping for every X consecutive subframes, the UE may calculate the transmission power of the PUSCH or the PUCCH only in the first subframe of the X consecutive subframes and may maintain the same transmission power during the X consecutive subframes. Referring to FIG. 9, the same transmission power may be maintained in the first two subframes 901 and 902 during repetitive transmissions of a total of 4 subframes 901, 902, 903 and 904, and the same transmission power may be maintained in the second two subframes 903 and 904 after the frequency hopping 905. At this time, the transmission power of the UE before and after the frequency hopping 905 may be different from each other.

When transmitting the PUCCH, the UE requiring coverage enhancement may calculate the transmission power of the PUCCH according to Equation 1, Equation 2, or Equation 4, or may use a previously fixed value without calculating the transmission power of the PUCCH. i of $P_{PUCCH}(i)$ denotes an index of a subframe constituting the X consecutive subframes among the N subframes for PUCCH transmission, and $P_{PUCCH}(i)$ is maintained during the X consecutive subframes.

In addition, when the UE requiring coverage enhancement transmits the PUSCH, the transmission power may be calculated according to Equation 5 or Equation 6, or a previously fixed value may be used without calculating the transmission power of the PUSCH. i of $P_{PUSCH}(i)$ denotes an index of a subframe constituting the X consecutive subframes among the N subframes for PUSCH transmission, and $P_{PUSCH}(i)$ is maintained during the X consecutive subframes. Here, X may be configured using RRC signaling by the eNB, or may be known as DCI. Also, X may be an arbitrary fixed value. Alternatively, X may be determined according to the number of times N the PUSCH or the PUCCH is repeated. For example, X may be determined as a multiple of N so that X=N/k may be satisfied for an arbitrary integer k.

In a case in which the UE in the coverage enhancement mode for transmitting the PUSCH or PUCCH receives the TPC command from the eNB during the X subframes as described above, when the accumulated closed-loop power transmission control is performed, the UE may accumulate all the TPCs received during the X subframes and may apply the result to the transmission power control of the first subframe among the next X subframes. Alternatively, when the UE receives the TPC command from the eNB during the X subframes, the TPC command is applied to the transmission power control of the first subframe among the next N subframes using the latest received TPC among the TPCs received during the X subframes regardless of the accumulated closed-loop power transmission control or absolute closed-loop power transmission control.

Since the transmission power of $P_{PUSCH}(i)$ or $P_{PUCCH}(i)$ in the UE requiring coverage enhancement for transmitting the PUSCH or PUCCH is limited to $P_{CMAX}(i)$, the fact that $P_{PUSCH}(i)$ or $P_{PUCCH}(i)$ is equally maintained during the X subframes includes the fact that $P_{CMAX}(i)$ is equally maintained during the X subframes.

Based on the fact that the UE requiring coverage enhancement for transmitting the PUSCH or PUCCH maintains the same power during the N subframes, it is also possible for the UE to operate differently according to the coverage enhancement mode. For example, in the coverage enhancement mode A, it may be possible to change the transmission power for each subframe transmission that needs to be repeated, but in the coverage enhancement mode B, the same power may need to be used in all the subframes that need to be repeated.

According to an example of the third embodiment of the present disclosure, the eNB may determine whether the UE in the coverage enhancement mode in which the PUSCH or the PUCCH is transmitted should equally maintain $P_{PUSCH}(i)$ or $P_{PUCCH}(i)$ during the N subframes or the X subframes, through cell common MTC-SIB, or may configure whether the UE in the coverage enhancement mode in which the PUSCH or the PUCCH is transmitted should equally maintain $P_{PUSCH}(i)$ or $P_{PUCCH}(i)$ during the N subframes or the X subframes, using RRC signaling for a specific UE. When the eNB does not configure to equally configure the $P_{PUSCH}(i)$ or $P_{PUCCH}(i)$ transmission power, the UE may calculate the transmission power in a conventional manner to calculate the transmission power of the PUSCH or the PUCCH. On the other hand, when the eNB configures to equally maintain the $P_{PUSCH}(i)$ or $P_{PUCCH}(i)$ transmission power, the UE may equally maintain the transmission power during the N subframes or the X subframes.

According to an example of the third embodiment of the present disclosure, the eNB may determine whether the UE in the coverage enhancement mode in which the PUSCH or the PUCCH is transmitted should equally maintain $P_{PUSCH}(i)$ or $P_{PUCCH}(i)$ during the N subframes or the X subframes, according to the coverage enhancement mode configured using RRC signaling for the UE. For example, when the eNB configures the coverage enhancement mode A for the UE, the UE may calculate the transmission power in an existing manner to calculate the transmission power of the PUSCH or the PUCCH. On the other hand, when the eNB configures the coverage enhancement mode B for the UE, the UE may equally maintain the transmission power during the N subframes or the X subframes.

An FD-MIMO system can support elevation and azimuth beamforming using dozens or more transmission antennas and can support multi-user MIMO (MU-MIMO) for more than 10 UEs.

Figure 10:
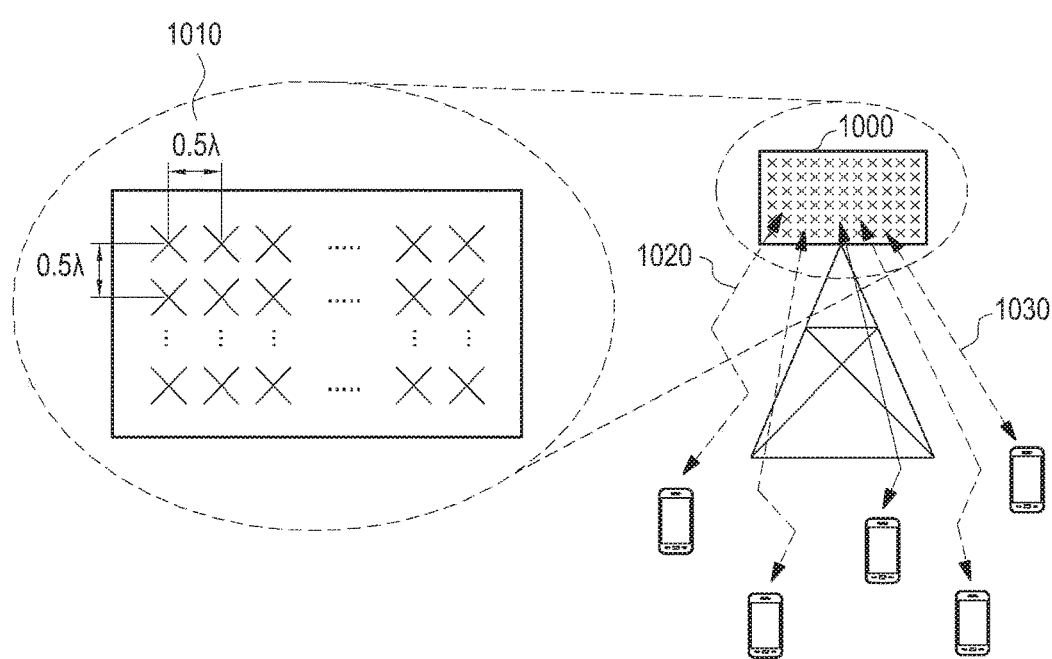
FIG. 10 is a diagram illustrating a schematic structure of a full-dimensional MIMO (FD-MIMO) system.

FIG. 10 is a diagram illustrating a schematic structure of a full dimensional MIMO (FD-MIMO) system.

Referring to FIG. 10, an eNB transmits a radio signal using a plurality of transmission antennas 1000. The plurality of transmission antennas 1000 is arranged to maintain a minimum distance from each other. One example of the minimum distance is a half 1010 of a wavelength length λ of the transmitted radio signal. When a distance that is the half of the wavelength length of the radio signal is maintained between the plurality of transmission antennas 1000, signals transmitted from the plurality of transmission antennas 1000 have a low correlation with each other. When a bandwidth of the transmitted radio signal is 2 GHz, the minimum distance is 7.5 cm, and when the bandwidth of the radio signal is higher than 2 GHz, the minimum distance is shorter than 7.5 cm.

The plurality of transmission antennas 1000 is used to transmit signals 1020 and 1030 to one or the plurality of UEs. The eNB may apply appropriate precoding to the signals before transmitting the signals, and may simultaneously transmit the precoded signals to the plurality of UEs. At this time, one UE may receive one or more information streams through the signals. The number of information streams that can be received by one UE is determined according to the number of reception antennas of the UE and the channel condition.

In order for the FD-MIMO system to be effectively implemented, the UE should accurately measure a channel condition and a magnitude of interference and transmit effective channel state information to the eNB. The eNB determines to which UEs the transmission is to be performed, determines at what data rate the transmission is to be performed, determines what type of precoding is to be applied, and the like, using the received channel state information. In the case of the FD-MIMO system, as the number of transmission antennas increases, the UE should transmit a larger amount of channel state information, i.e., control information, to the eNB in the uplink, thereby causing an overhead problem.

In a mobile communication system, time, frequency, and power resources are limited. Therefore, when a large amount of resources are allocated for transmission of a reference signal used for channel measurement of a UE, an amount of resources that can be allocated by the eNB to a traffic channel for transmitting data is reduced, so that an absolute amount of data to be transmitted is reduced. In this case, although performance of channel measurement and estimation may be improved, the absolute amount of data to be transmitted is reduced, so that the overall system throughput performance may be lowered. Accordingly, for optimal performance in terms of overall system throughput, proper allocation is required between resources for transmitting the reference signal and resources to be allocated to the traffic channel.

Figure 11:
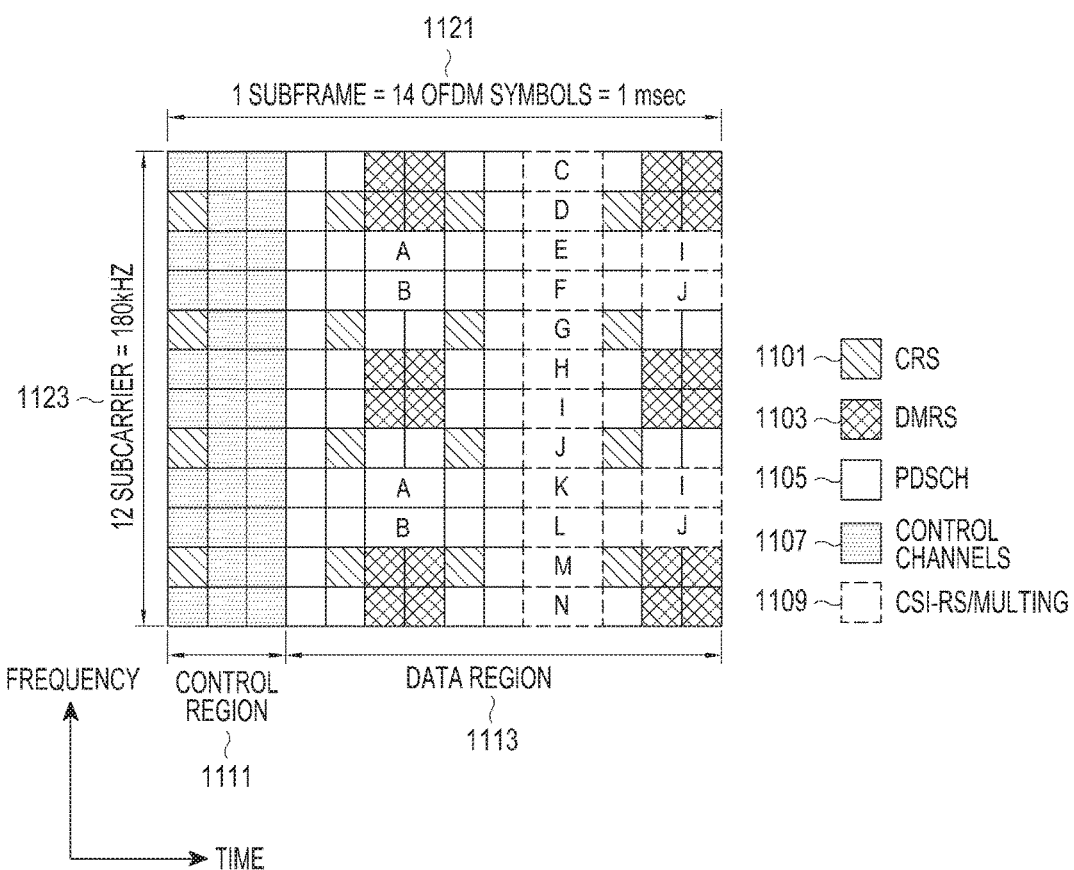
FIG. 11 is a diagram illustrating a minimum unit of resources which an evolved Node B (eNB) can schedule in a downlink in an LTE/LTE-A system, in a time-frequency domain.

FIG. 11 is a diagram illustrating a minimum unit of resources which eNB can schedule in a downlink in an LTE/LTE-A system, in a time-frequency domain.

Referring to FIG. 11, a minimum unit of the resources is composed of one subframe, that is, 14 OFDM symbols 1121 on a time domain, and is composed of 12 subcarriers 1123 on a frequency domain. Since one OFDM symbol and one subcarrier constitute one resource element RE, the minimum unit of the resources is composed of a total of 14×16=168 Res.

The following different types of signals may be transmitted to each minimum unit of the resources.

A cell specific RS (CRS) 1101 is a reference signal periodically transmitted for all UEs belonging to one cell. A plurality of UEs belonging to the one cell can commonly use the CRS.

A demodulation reference signal (DMRS) 1103 is a reference signal transmitted for a specific UE. The eNB transmits the DMRS only when it transmits data to the specific UE. The DMRS can be transmitted using a total of 8 DMRS ports. In an LTE/LTE-A, ports 7 to 14 correspond to the 8 DMRS ports, and signals transmitted from the ports maintain orthogonality using code division multiplexing (CDM) or frequency division multiplexing (FDM) so that interference does not occur with each other.

A physical downlink shared channel (PDSCH) 1105 is a data channel transmitted to the downlink. The PDSCH is used when the eNB transmits traffic to the UE. In a data region 1113 of FIG. 11, REs to which reference signals are not transmitted may be allocated for the PDSCH.

A channel status information reference signal (CSI-RS) is a reference signal transmitted for UEs belonging to one cell. The CSI-RS is used to measure channel conditions. A plurality of CSI-RSs may be transmitted in the one cell. The arrangement of the REs to which the CSI-RS is transmitted within one RB is defined as a pattern, and different patterns may be used depending on the number of antenna ports used for the CSI-RS.

The other control channels (a physical hybrid ARQ indicator channel (PHICH), a physical control format indicator channel (PCFICH), and a physical downlink control channel (PDCCH)) 1107 may be used to provide control information necessary for the UE to receive the PDSCH or used to transmit ACK/NACK for operating HARQ for data transmission of the uplink.

In addition to the above signals, the LTE-A system may configure muting 1109 on specific RE(s) so that UEs of a corresponding cell can receive the CSI-RS transmitted by another eNB without interference. The muting 1109 may be applied at a position where the CSI-RS of the other eNB can be transmitted, and the UEs of the corresponding cell may receive a traffic signal through the remaining resource region except for the signal transmitted from the specific RE 1109. In the LTE-A system, since muting is applied to the position of the CSI-RS and transmission power is not transmitted thereto due to characteristics of the muting, muting is also referred to as a zero-power CSI-RS.

Referring to FIG. 11, the CSI-RS may be transmitted using some of positions indicated by A, B, C, D, E, E, F, G, H, I and J according to the number of antennas transmitting the CSI-RS. The muting can also be applied to some of the positions indicated by A, B, C, D, E, E, F, G, H, I, and J. In particular, the CSI-RS can be transmitted in 2, 4, and 8 REs according to the number of antenna ports transmitting the CSI-RS. For example, it is assumed that there are four patterns for transmitting the CSI-RS. When the number of antenna ports is 2, the CSI-RS is transmitted using half of the pattern in FIG. 11, and when the number of antenna ports is 4, the CSI-RS is transmitted using the entirety of the specific pattern. When the number of antenna ports is 8, the CSI-RS is transmitted using two patterns. On the other hand, muting is always done in units of one pattern. That is, although the muting can be applied to a plurality of patterns, the muting cannot be applied to only a part of one pattern when the position of the CSI-RS and the position of the muting do not overlap each other. However, the muting can be applied to only a part of one pattern only when the position of the CSI-RS overlaps with the position of the muting.

When the CSI-RS for two antenna ports is transmitted, the CSI-RS is transmitted using two consecutive REs on the time axis in the two antenna ports, and signals of the antenna ports are separated by orthogonal codes. In addition, when the CSI-RS for four antenna ports is transmitted, two more REs are further used to further transmit the signals for the two antenna ports in the same manner, in addition to the REs of the CSI-RS for the two antenna ports. The same method may be applied even when CSI-RS for eight antenna ports is transmitted.

In a cellular system, an eNB transmits a reference signal for measuring a downlink channel state. In the LTE-A system of 3GPP, a UE measures a channel state between the eNB and the UE using the CRS or CSI-RS transmitted from the eNB. As the channel state, several factors have to be fundamentally considered. For example, the channel state includes an amount of interference in the downlink. The amount of interference in the downlink includes an interference signal and a thermal noise generated by the antenna of an adjacent eNB, and plays an important role in determining a channel condition of the downlink by the UE. For example, when a reception antenna transmits a reference signal to one UE in the eNB having one transmission antenna, the UE should discern energy per symbol that can be received in the downlink from the received reference signal and an amount of interference received simultaneously in the interval in which the corresponding symbol is received to determine a ratio Es/Io of the symbol energy to the amount of interference. The determined ratio Es/Io is converted into data, a transmission rate, or a value corresponding thereto, and is made known to the eNB in the form of CQI so that the eNB may allow the UE to determine at what data rate the transmission is to be performed in the downlink.

In the case of the LTE-A system, the UE feeds back information on the channel state of the downlink to the eNB so that the eNB can utilize the information for downlink scheduling. That is, the UE measures a reference signal transmitted by the eNB to the downlink to extract information, and feeds back the extracted information to the eNB in a form defined by the LTE/LTE-A standard. In the LTE/LTE-A system, the information fed back by the UE roughly includes the following three pieces of information.

A rank Indicator (RI) refers to the number of spatial layers that the UE can receive in a current channel state.

A precoder matrix indicator (PMI) refers to an indicator of a precoding matrix that the UE prefers in the current channel state.

A channel quality indicator (CQI) indicates a maximum data rate that the UE can receive in the current channel state. The CQI may be replaced by signal-to-noise interference (SINR), a maximum error correction coding rate, a modulation scheme, data efficiency per frequency, etc., which can be utilized similar to the maximum data rate.

RI, PMI, and CQI are related to each other and have a meaning. For example, the precoding matrix supported by the LTE/LTE-A system is defined differently for each rank. Accordingly, when RI has a value of 1 and when a PMI value X and RI have a value of 2, the PMI value X is interpreted differently. Also, even when the UE determines the CQI, it is assumed that a PMI value Y, i.e., PMI_Y, and an RI value X, i.e., RI_X, which are made known to the eNB by the UE, has been applied to the eNB. That is, the fact that the UE notifies the eNB of the RI_X, PMI_Y, and CQI Z corresponds to the fact that data can be received at a data rate corresponding to CQI_Z when rank is RI_X and the precoding is PMI_Y. In this manner, when calculating the CQI, the UE assumes a transmission scheme to be performed by the eNB, and obtains optimized performance when the transmission is actually performed in the corresponding transmission scheme.

In general, when a large number of transmission antennas are provided, such as in FD-MIMO, a CSI-RS proportional thereto should be transmitted. For example, when 8 transmission antennas are used in the LTE/LTE-A system, the eNB transmits the CSI-RSs corresponding to 8 ports to the UE, thereby allowing the UE to measure the channel state of the downlink. At this time, when the eNB transmits the CSI-RSs corresponding to the 8 ports, 8 REs are used within the minimum unit of the resources as shown in A and B of FIG. 11. When the CSI-RS transmission scheme of the LTE/LTE-A system is applied to FD-MIMO, REs proportional to the number of transmission antennas should be allocated for transmission of the CSI-RS. That is, when the number of transmission antennas of the eNB is 128, the eNB should transmit the CSI-RS using a total of 128 REs within the minimum unit of the resources. Since the CSI-RS transmission scheme requires an excessive amount of resources, there is an adverse effect of reducing resources required for data transmission and reception.

The eNB having a large number of transmission antennas, such as the FD-MIMO, may use the following two methods to transmit the CSI-RS. A first method is a method of transmitting the CSI-RS by allocating the same number of resources as the number of the antennas, and a second method is a method of dividing the CSI-RS into a plurality of dimensions and transmitting the divided CSI-RS.

Figures 12A, 12B:
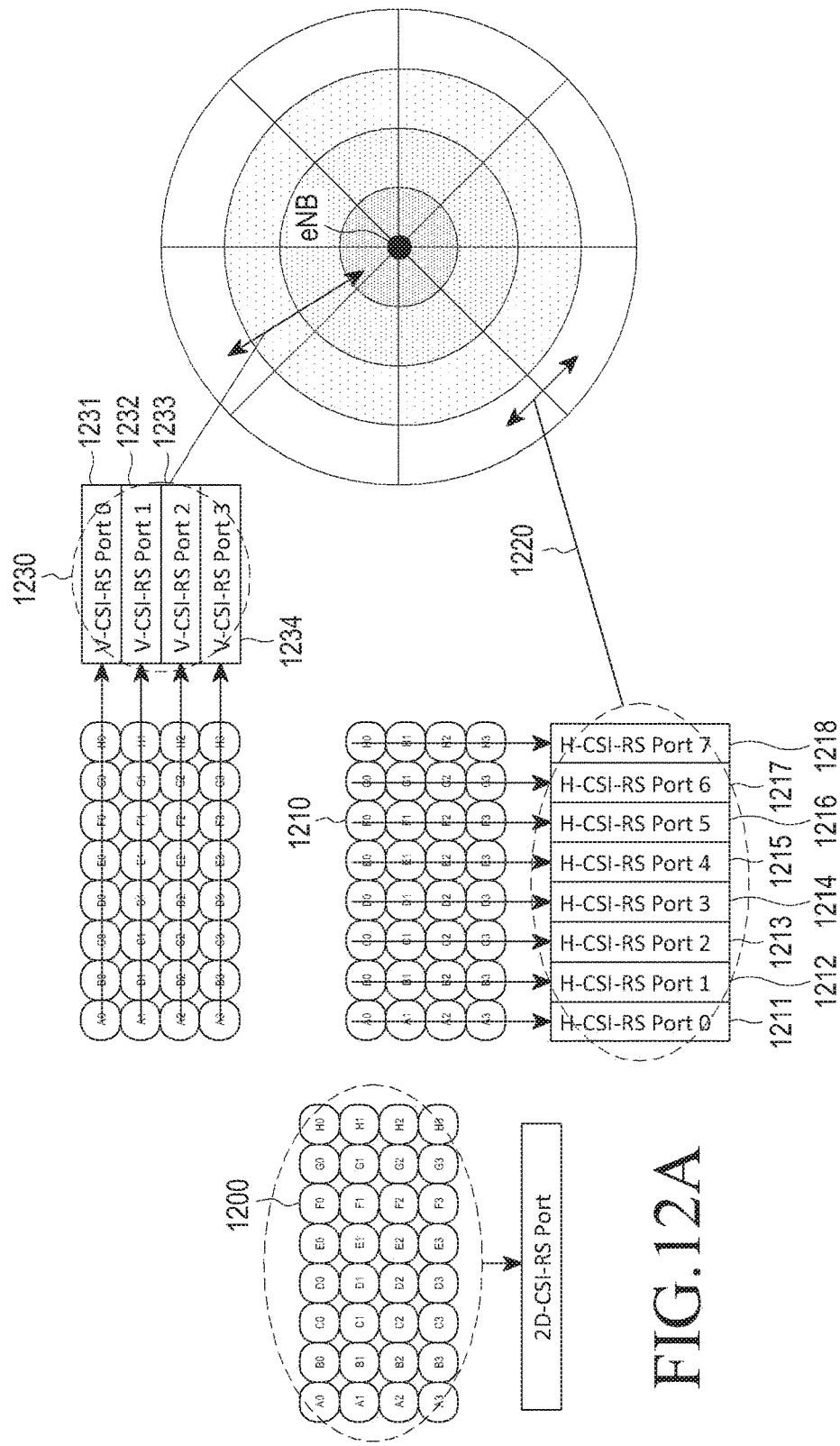
FIGS. 12A and 12B are diagrams illustrating a first method and a second method of transmitting a CSI-RS.

FIGS. 12A and 12B are diagrams illustrating a first method and a second method of transmitting a CSI-RS.

Referring to FIG. 12, the eNB operating FD-MIMO has a total of 32 antennas (A0, . . . , A3, B0, . . . , C3, D0, . . . , D3, E0, . . . , F3, G0, . . . , G3, and H0, . . . , H3). FIG. 12A shows the first method of transmitting the CSI-RS by allocating the same number of resources as the number of antennas. The 32 antennas 1200 transmit one two-dimensional CSI-RS (2D-CSI-RS). The 2D-CSI-RS may indicate the channel states of all horizontal and vertical antennas. The first method allocates all resources for each antenna to increase the accuracy of channel information. However, the first method uses a relatively large amount of resources for control information and data, which is disadvantageous in terms of resource efficiency.

FIG. 12B shows the second method of allowing the UE to perform channel measurement on a large number of transmission antennas while allocating a relatively small number of resources even though the accuracy of the channel information is relatively low. In the second method, the entire CSI-RS is divided into N dimensions and transmitted. For example, when the transmission antennas of the eNB are arranged in two dimensions as shown in FIG. 12, the entire CSI-RS is divided into two dimensions and transmitted. At this time, one dimension is operated as a horizontal CSI-RS which measures horizontal channel information and the other one dimension is operated as a vertical CSI-RS which measures vertical channel information. In FIG. 12B, 32 antennas 1210 are indicated by A0, . . . , A3, B0, . . . , B3, C0, . . . , C3, D0, . . . , D3, E0, . . . , E3, F0, . . . , F3, G0, . . . , G3, and H0, . . . , H3 in the similar manner to that in FIG. 12A. Referring to FIG. 12B, the 32 antennas transmit a horizontal CSI-RS (H-CSI-RS) and a vertical CSI-RS (V-CSI-RS). At this time, an H-CSI-RS 1220, which can be used to measure the channel state in the horizontal direction, can be allocated to the following 8 antenna ports. An H-CSI-RS port 0 (1211) is formed by combining the antennas A0, A1, A2 and A3, and an H-CSI-RS port 1 (1212) is formed by combining the antennas B0, B1, B2 and B3. An H-CSI-RS port 2 (1213) is formed by combining the antennas C0, C1, C2 and C3, and an H-CSI-RS port 3 (1214) is formed by combining the antennas D0, D1, D2 and D3. An H-CSI-RS port 4 (1215) is formed by combining the antennas E0, E1, E2 and E3, and an H-CSI-RS port 5 (1216) is formed by combining the antennas F0, F1, F2 and F3. An H-CSI-RS port 6 (1217) is formed by combining the antennas G0, G1, G2 and G3. Finally, an H-CSI-RS port 7 (1218) is formed by combining the antennas H0, H1, H2 and H3. The fact that the combination of a plurality of antennas forms one CSI-RS port means antenna virtualization. Generally, antenna virtualization is performed through the linear combination of a plurality of antennas.

In addition, a V-CSI-RS 1230 for measuring the channel state in the vertical direction can be allocated to the following 4 antenna ports. A V-CSI-RS port 1 (1232) is formed by combining the antennas A0, B0, C0, D0, E0, F0, G0 and H0, and a V-CSI-RS port 1 (1232) is formed by combining the antennas A1, B1, C1, D1, E1, F1, G1, and H1. A V-CSI-RS port 2 (1233) is formed by combining the antennas A2, B2, C2, D2, E2, F2, G2, and H2, and a V-CSI-RS port 3 (1234) is formed by combining A3, B3, C3, D3, E3, F3, G3, and H3.

When a plurality of antennas are arranged in this dimension as M×N (vertical direction×horizontal direction) as described above, the UE uses N horizontal CSI-RS ports and M vertical CSI-RS ports to measure a channel of FD-MIMO. That is, when two-dimensional CSI-RS is used, the UE may discern channel state information using M+N CSI-RS ports for M×N transmission antennas. The use of such a small number of CSI-RS ports allows the UE to discern information on a large number of transmission antennas, which is an important advantage in reducing a CSI-RS overhead. In the above description, the UE discerns the channel information on the transmission antenna of FD-MIMO using two CSI-RSs, and this approach can be equally applied to a case of using K CSI-RSs.

In FIG. 12B, 32 transmission antennas are allocated to the 8 H-CSI-RS ports 1220 and the 4 V-CSI-RS ports 1230 to transmit CSI-RS, so that the UE may measure a radio channel of the FD-MIMO system based on the received CSI-RS. The H-CSI-RS can be used for the UE to measure information about a horizontal angle between the transmission antenna of the eNB and the UE, and the V-CSI-RS can be used for the UE to measure information about a vertical angle between the transmission antenna of the eNB and the UE.

The following abbreviations are used to describe the present disclosure.

$RI_H$ denotes a rank indicator of a channel obtained by applying vertical precoding to the 2D-CSI-RS or a rank indicator of a channel obtained by measuring a horizontal CSI-RS (H-CSI-RS). The UE notifies the eNB of the $RI_H$.

$RI_V$ denotes a rank indicator of a channel obtained by applying horizontal precoding to the 2D-CSI-RS or a rank indicator of a channel obtained by measuring a vertical CSI-RS (V-CSI-RS). The UE notifies the eNB of the $RI_V$.

$RI_{HV}$ denotes a rank of a channel obtained by the UE simultaneously applying horizontal and vertical precoding to the 2D-CSI-RS. The UE may notify the eNB of the $RI_{HV}$ or may become a rank indicator determined according to a predetermined rule.

$PMI_H$ denotes a precoding matrix indicator that is made known to the eNB by the UE obtaining optimal precoding based on the channel obtained by applying vertical precoding to the 2D-CSI-RS or the channel obtained by measuring horizontal CSI-RS (H-CSI-RS).

PMIV denotes a precoding matrix indicator that is made known to the eNB by the UE obtaining optimal precoding based on the channel obtained by applying horizontal precoding to the 2D-CSI-RS or the channel obtained by measuring vertical CSI-RS (V-CSI-RS).

CQIH indicates a data rate supported by the UE, which is generated under the assumption that only the horizontal precoding has been applied.

CQIV indicates a data rate supported by the UE, which is generated under the assumption that only the vertical precoding has been applied.

CQIHV indicates a data rate supported by the UE, which is generated under the assumption that horizontal precoding and vertical precoding are simultaneously applied.

In this disclosure, the channel state information in the horizontal direction and the channel state information in the vertical direction are separately described, but can also be described in general terms such as first channel state information or second channel state information.

The UE transmits RI, PMI, and CQI to the eNB for the 2D-CSI-RS or the plurality of CSI-RSs transmitted as shown in FIGS. 12A and 12B, so that the state of the radio channel of the FD-MIMO system may be made known to the eNB.

Figure 13:
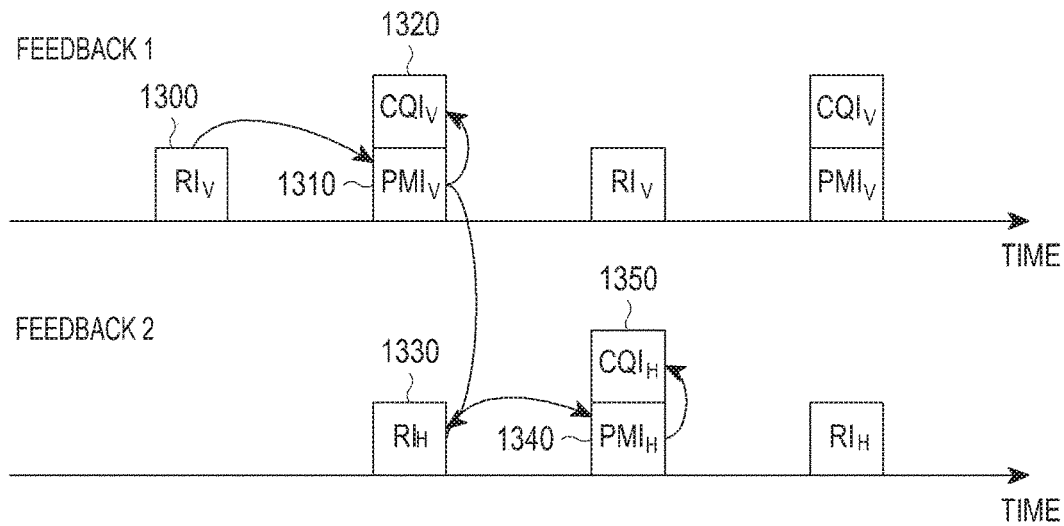
FIG. 13 is a diagram illustrating a case in which a UE transmits RI, PMI, and CQI to a 2D-CSI-RS.

FIG. 13 is a diagram illustrating a case in which a UE transmits RI, PMI, and CQI to a 2D-CSI-RS.

In FIG. 13, arrows indicate how one kind of channel state information is related to interpreting another kind of channel state information. That is, an arrow starting from an $RI_V$ 1300 ends at a $PMI_V$ 1310, which means that the interpretation of the $PMI_V$ 1310 differs depends on a value of the $RI_V$ 1300.

In FIG. 13, the UE measures the 2D-CSI-RS and transmits vertical channel state information as feedback 1. In addition, channel information 1320 corresponding to the vertical direction is obtained using information on the optimal vertical precoding 1310 obtained at this time, a rank such as an $RI_V$ 1330 is obtained, and then an optimal precoding $PMI_H$ 1340 corresponding to the horizontal direction is obtained to transmit the horizontal channel state information as feedback 2. In the above description, RI, PMI, and CQI are correlated and transmitted. That is, in the case of feedback 1, the precoding matrix of a corresponding rank indicated by the $PMI_V$ 1310 to be transmitted thereafter is made known by the $RI_V$ 1300. Also, in a case in which the eNB transmits the $CQI_V$ 1320 to the rank indicated by the $RI_V$ 1300, when the precoding matrix of the corresponding rank indicated by the $PMI_V$ 1310 is applied, the channel state information corresponds to a data rate at which the UE can receive data or a value corresponding thereto. In the case of feedback 2, RI, PMI, and CQI are correlated and transmitted in the same manner as that in feedback 1.

Figure 14:
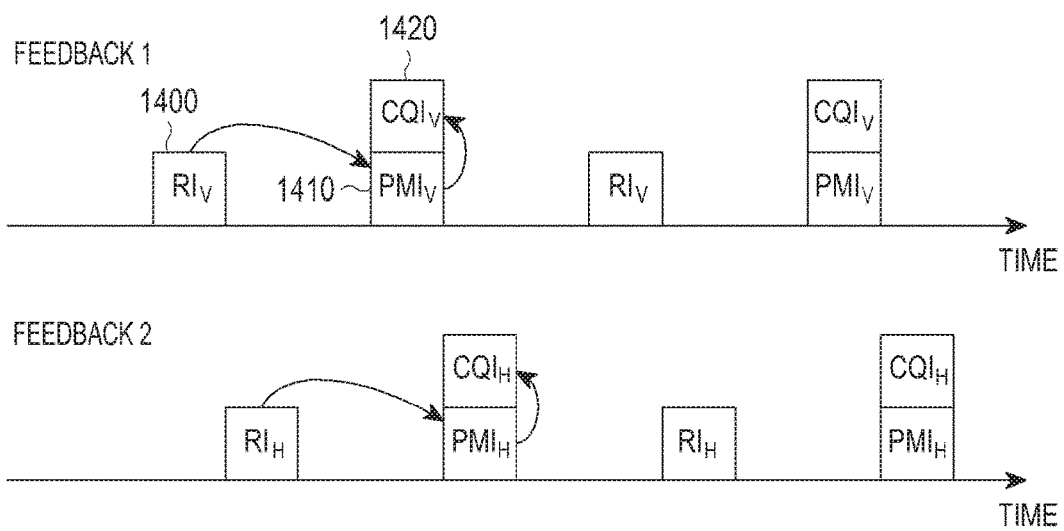
FIG. 14 is a diagram illustrating a case in which a UE transmits RI, PMI, and CQI to a plurality of CSI-RSs.

FIG. 14 is a diagram illustrating a case in which a UE transmits RI, PMI, and CQI to a plurality of CSI-RSs.

In FIG. 14, the UE measures V-CSI-RS and transmits channel state information as feedback 1. In addition, the UE measures H-CSI-RS and transmits channel state information as feedback 2. In the feedback 1 and the feedback 2, RI, PMI, and CQI are correlated and transmitted. That is, in the case of the feedback 1, the precoding matrix of a corresponding rank indicated by the $PMI_V$ 1410 to be transmitted thereafter is made known by the $RI_V$ 1400. Also, in a case in which the eNB transmits the $CQI_V$ 1420 to the rank indicated by the $RI_V$ 1400, when the precoding matrix of the corresponding rank indicated by the $PMI_V$ 1410 is applied, the channel state information corresponds to a data rate at which the UE can receive data or a value corresponding thereto. In the case of feedback 2, RI, PMI, and CQI are correlated and transmitted in the same manner as that in feedback 1.

As shown in FIGS. 13 and 14, the eNB of the FD-MIMO system configures the 2D-CSI-RS or a plurality of feedbacks for a plurality of transmission antennas to cause the UE to report channel state information to the eNB, as an example of channel state information reporting in the FD-MIMO system. In the above-described example, there is an advantage in that an additional implementation for the UE to generate and report channel state information is not required in the FD-MIMO system. On the other hand, when a method of reporting the channel state information described in FIG. 13 is used, the performance of the FD-MIMO system cannot be sufficiently obtained. The reason why the performance of the FD-MIMO system is not sufficiently obtained is that the UE does not transmit the CQI to the eNB assuming precoding when the FD-MIMO system is applied.

In the FD-MIMO system, when a plurality of transmission antennas is two-dimensionally arranged as shown in FIG. 12, both the vertical precoding and the horizontal precoding are applied to a signal transmitted to the UE and transmitted. That is, the UE receives a signal to which the precoding methods corresponding to $PMI_H$ and PMIV are simultaneously applied, instead of receiving a signal to which only one of the precoding methods corresponding to $PMI_H$ and $PMI_V$ shown in FIGS. 13 and 14 is applied. As shown in FIGS. 13 and 14, when only $CQI_H$ and $CQI_V$ of a case in which the precoding methods corresponding to $PMI_H$ and PMIV are separately applied are reported to the eNB, the eNB cannot receive the CQI of a case in which both the vertical and horizontal precoding methods are applied from the UE, so that the eNB should determine the CQI on its own. In this manner, the eNB arbitrarily determining the CQI of the case in which both the vertical and horizontal precoding methods are applied based on the CQIs of the case in which the vertical and horizontal precoding methods are separately applied may cause degradation of the performance of the system.

The eNB and the UE may determine the $RI_{HV}$, which is the rank when both the precoding methods are used based on the $RI_H$ and $RI_V$, by a predetermined method. Equation 9 is an example of a rule for obtaining $RI_{HV}$ using $RI_H$ and $RI_V$.

$$RI_{HV} = RI_H \times RI_V \quad \text{[Equation 9]}$$

It is necessary to define how to determine the CQI when a plurality of precoding methods is applied. When calculating the CQI when only one precoding method is applied, the UE calculates the CQI on the assumption that the precoding method specified by RI and PMI notified by the UE is applied to the downlink. However, in the case of $CQI_{HV}$, the UE calculates the CQI on the assumption that two precoding methods are simultaneously applied to the downlink. At this time, the UE can interpret the fact that the two precoding methods are simultaneously applied in various ways, and a Kronecker product can be one of such interpretation methods. The Kronecker product is defined for two matrices as shown in Equation 10.

$$A \otimes B = \begin{bmatrix} a_{11}B & \cdots & a_{1n}B \\ \vdots & \ddots & \vdots \\ a_{m1}B & \cdots & a_{mn}B \end{bmatrix}, \quad \text{[Equation 10]}$$

In Equation 10, A and B can be replaced with a precoding matrix designated by each of $PMI_H$ and $PMI_V$ to obtain a precoding matrix when the two precoding methods are simultaneously applied. When calculating the $CQI_{HV}$, the UE calculates the CQI on the assumption that the precoding matrix obtained by applying Equation 10 to the precoding matrix designated by $PMI_H$ and $PMI_V$ is applied to the downlink.

In order to obtain the precoding matrix when the two precoding methods are simultaneously applied using the Kronecker product of Equation 10, it is necessary to define the operation between the UE and the eNB according to the rank notified by the UE.

An RI-reference CSI-process supported by the LTE system is a technique for reporting channel state information assuming the same RI as that reported in the CSI-process designated as the RI-reference CSI-process by a plurality of CSI-processes. In the current LTE system, the RI-reference CSI-process is possible only when a PMI/RI report is configured together with a transmission mode 10. This technique is configured through the following field through a radio resource control (RRC) signaling message.

mitted from the TPs 1501 and 1503 to the UE 1511 based on each CSI-process. Since the current LTE standard does not support a method of receiving a channel state report assuming different TPs for each sub-band, the UE 1511 should operate the plurality of CSI-processes corresponding to the number of TPs. However, since the entire sub-band should be operated using the same rank in order for the UE to receive and decode data, the channel state report should also be generated assuming the same rank. Therefore, one TP designates the CSI-process connected to the one TP as the RI-reference CSI-process, and the channel state report received from the CSI-processes connected with the other TPs is made assuming the same rank as the corresponding TP so that the corresponding operation can be performed.

Figure 15A:
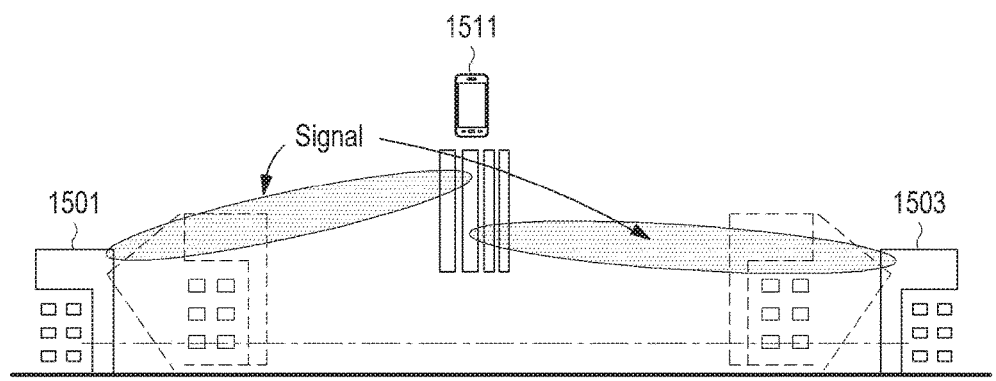
FIGS. 15A and 15B are diagrams illustrating two transmission points (TP) that operate as JT and DB.
Figure 15B:
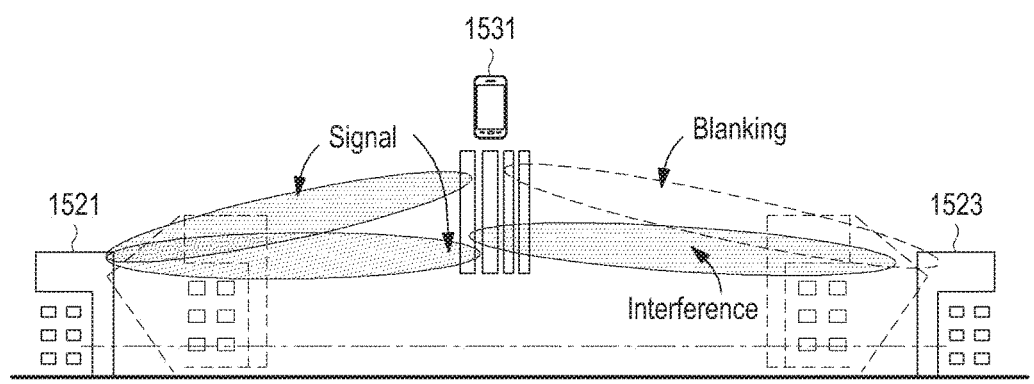

In addition, FIG. 15B shows a case in which, when one TP 1521 transmits data to one UE 1531, another TP 1523 does not generate interference by applying a DB in a specific sub-band and generates interference because the DB is not applied in another specific sub-band. In the current LTE system, it does not support the method of receiving the channel state report assuming different interference conditions for each sub-band. In addition, in a situation where the DB is not applied and the signal-to-interference ratio (SINR) is low, the efficiency of a plurality of ranks becomes low so that the rank reported by the UE through the channel state report may vary depending on the interference condition. Accordingly, in order to simultaneously support the sub-band in which the DB is applied to one UE and the sub-band in which the DB is applied to one UE, one CSI-process is designated as the RI-reference CSI-process so that the other CSI-processes may generate the channel state report assuming the same rank as that of the RI reported by the corresponding CSI-process.

In the LTE system, in order to periodically report the channel state using the corresponding RI-reference CSI-process, in a case in which a periodic channel state reporting mode (including sub-mode when it is configured), the number of CSI-RS antenna ports, and subframe sets $C_{CSI,0}$ and $C_{CSI,1}$ are not configured in the corresponding CSI-processes through upper layer signaling, when a set of limited RIs using precoder subset restriction, a set of limited RIs using precoder subset restriction in the case in which the subframe sets $C_{CSI,0}$ and $C_{CSI,1}$ are configured through the upper layer signaling, and a set of limited RIs of the corresponding subframe set in the case in which the subframe sets $C_{CSI,0}$ and $C_{CSI,1}$ are configured through the upper layer signaling only with respect to only one CSI process are all the same,

```
CQI-ReportBothProc-r11 ::= SEQUENCE {
      ri-Ref-CSI-ProcessId-r11              CSI-ProcessId-r11
                  OPTIONAL,                 -- Need OR
      pmi-RI-Report-r11                                        ENUMERATED    {setup}
                        OPTIONAL            -- Need OR
}
-- ASN1STOP
```

The RI-reference CSI-process is a technique for supporting joint transmission (hereinafter, referred to as JT) and dynamic blanking (hereinafter, referred to as DB) in coordinated multi-point transmission (CoMP).

FIGS. 15A and 15B are diagrams illustrating two transmission points (TP) that operate as JT and DB.

FIG. 15A shows that a plurality of TPs 1501 and 1503 simultaneously transmit data to one UE 1511 in different sub-bands. The plurality of TPs 1501 and 1503 receives reports for RI, PMI, and CQI, assuming that data is transthe UE does not expect different configuration for at least one of the set of limited RIs using the precoder subset restriction in each CSI process.

In addition, in the LTE system, in order to non-periodically report the channel state using the corresponding RI-reference CSI-process, in a case in which a non-periodic channel state reporting mode, the number of CSI-RS antenna ports, and subframe sets $C_{CSI,0}$ and $C_{CSI,1}$ are not configured in the corresponding CSI-processes through upper layer signaling, when a set of limited RIs using precoder subset restriction, a set of limited RIs using precoder subset restriction in the case in which the subframe sets $C_{CSI,0}$ and $C_{CSI,1}$ are configured through the upper layer signaling, and a set of limited RIs of the corresponding subframe set in the case in which the subframe sets $C_{CSI,0}$ and $C_{CSI,1}$ are configured through the upper layer signaling only with respect to only one CSI process are all the same, the UE does not expect different configuration for at least one of the set of limited RIs using the precoder subset restriction in each CSI process.

An LTE Rel-11 standard uses a physical uplink control channel (PUCCH) for periodic state reporting. The PUCCH is an L1 message and its maximum size is limited to 11 bits. Since the coverage is reduced when a large number of bits are included in the PUCCH, various reporting types are used to multiplex various pieces of information. The following describes the reporting types.

Type 1: CQI feedback for UE selected sub-band
Type 1a: sub-band CQI and second PMI feedback
Type 2, Type 2b, Type 2c: wideband CQI and PMI feedback
Type 2a: wideband PMI feedback
Type 3: RI feedback
Type 4: wideband CQI feedback
Type 5: RI and wideband PMI feedback
Type 6: RI and precoding type indicator (PTI) feedback In the periodic channel state reporting, the PUCCH cannot transmit a plurality of channel state reports at a time. Therefore, when reporting periods overlap each other, the PUCCH first may transmit the channel state report having a higher priority and a longer period according to importance and reporting period thereof, and may drop (i.e., omit) the channel state report having a shorter period and a lower priority. An example of the priority for the periodic channel state reporting is as follows.

In the reporting type of the PUCCH in one serving cell, the priority of the reporting type 3, 5, or 6 (including RI) is higher than the priority of the reporting type 1, 1a, 2, 2a, 2b, 2c, or 4 of the same serving cell. In the reporting type of the PUCCH in one serving cell, the priority of the reporting type 3, 5, 6, or 2a (including RI and wideband PMI) is higher than the priority of the reporting type 1, 1a, 2, 2a, 2b, 2c, or 4 of another serving cell. In the reporting type of the PUCCH in one serving cell, the priority of the reporting type 2, 2b, 2c, or 4 (including wideband PMI) is higher than the priority of the reporting type 1 or 1a of the other serving cell. When the priority of the reporting type of the PUCCH in one serving cell is the same as the priority of the PUCCH reporting type in the other serving cell, the priority of the PUCCH reporting type of the cell having a low serving cell index ServCellIndex is considered to be high.

Hereinafter, an OFDM-based wireless communication system, particularly, a 3GPP evolved universal terrestrial radio access (EUTRA) standard will be mainly described, but the present disclosure is not limited thereto.

Fourth Embodiment

In order to operate the above-described RI-reference CSI-process together with the $RI_H$ and $RI_V$ based on 2D precoding, an operation different from an existing CSI-process is required. Since the existing channel state reporting was operated using one rank, it is sufficient to consider only one RI. However, since $RI_H$ and $RI_V$ are respectively reported in 2D CSI based on the 2D precoding, RI-reference CSI-process should be operated based on consideration for each RI.

In the case of UEs transmitting periodically or non-periodically the channel state report using the 2D precoding or 2D channel state reporting, an antenna structure or a codebook/feedback structure are changed, so that a different consideration for the CSI-process configuration is needed. For this configuration, in order for the UE transmitting the 2D channel state report to periodically transmit the channel state report using the RI-reference CSI-process, in a case in which a periodic channel state reporting mode (including sub-mode when it is configured), the number of 2D CSI-RS antenna ports, and subframe sets $C_{CSI,0}$ and $C_{CSI,1}$ are not configured in the corresponding CSI-processes through upper layer signaling, when a set of limited $RI_{HV}$s using precoder subset restriction, a set of limited $RI_{HV}$s using precoder subset restriction in the case in which the subframe sets $C_{CSI,0}$ and $C_{CSI,1}$ are configured through the upper layer signaling, and a set of limited $RI_{HV}$s of the corresponding subframe set in the case in which the subframe sets $C_{CSI,0}$ and $C_{CSI,1}$ are configured through the upper layer signaling only with respect to only one CSI process are all the same, the UE does not expect a different configuration for at least one of the set of limited $RI_{HV}$s using the precoder subset restriction in each CSI process.

In addition, in order for the UE transmitting the 2D channel state report to non-periodically transmit the channel state report using the corresponding RI-reference CSI-process, in a case in which a non-periodic channel state reporting mode (including sub-mode when it is configured), the number of 2D CSI-RS antenna ports, and subframe sets $C_{CSI,0}$ and $C_{CSI,1}$ are not configured in the corresponding CSI-processes through upper layer signaling, when a set of limited $RI_{HV}$s using precoder subset restriction, a set of limited $RI_{HV}$s using precoder subset restriction in the case in which the subframe sets $C_{CSI,0}$ and $C_{CSI,1}$ are configured through the upper layer signaling, and a set of limited $RI_{HV}$s of the corresponding subframe set in the case in which the subframe sets $C_{CSI,0}$ and $C_{CSI,1}$ are configured through the upper layer signaling only with respect to only one CSI process are all the same, the UE transmitting the 2D channel state report does not expect different configuration for at least one of the set of limited $RI_{HV}$s using the precoder subset restriction in each CSI process.

The above-described method relates to a method for configuring the CSI-process for periodic channel state reporting and aperiodic channel state reporting. In the above embodiment, the number of antenna ports and the total number of 2D antenna ports for RI set restriction are equally configured with respect to $RI_{HV}$, that is, composite RI, so that the corresponding CSI-processes can report the channel state according to the assumption of the RI-reference CSI-process under the same configuration.

However, in a case of a 2D antenna, various shapes can be applied to the same number of antenna ports, so that data that can be transmitted in the corresponding antenna shape may be significantly different. Therefore, unlike the above example, it is also possible to limit the number of antenna ports and the limited RI set to be the same for each dimension. The following is to limit the CSI-process method for configuring periodic or aperiodic channel state reporting with respect to the number of antenna ports and the RI set restriction for each dimension. In order for the UE transmitting the 2D channel state report to periodically transmit the channel state report using the corresponding RI-reference CSI-process with respect to the number of antenna ports for each dimension and the RI set restriction, in a case in which a periodic channel state reporting mode (including sub-mode when it is configured), the number of CSI-RS antenna ports for each dimension, and subframe sets $C_{CSI,0}$ and $C_{CSI,1}$ are not configured in the corresponding CSI-processes through upper layer signaling, when sets of limited $RI_H$s and $RI_V$s using precoder subset restriction, sets of limited $RI_H$s and $RI_V$s using precoder subset restriction in the case in which the subframe sets $C_{CSI,0}$ and $C_{CSI,1}$ are configured through the upper layer signaling, and sets of limited $RI_H$s and $RI_V$s of the corresponding subframe set in the case in which the subframe sets $C_{CSI,0}$ and $C_{CSI,1}$ are configured through the upper layer signaling only with respect to only one CSI process are all the same, the UE does not expect different configuration for at least one of the sets of limited $RI_H$s and $RI_V$s using the precoder subset restriction in each CSI process.

In addition, in order for the UE transmitting the 2D channel state report to non-periodically transmit the channel state report using the corresponding RI-reference CSI-process, in a case in which a non-periodic channel state reporting mode, the number of CSI-RS antenna ports for each dimension, and subframe sets $C_{CSI,0}$ and $C_{CSI,1}$ are not configured in the corresponding CSI-processes through upper layer signaling, when sets of limited $RI_H$s and $RI_V$s using precoder subset restriction, sets of limited $RI_H$s and $RI_V$s using precoder subset restriction in the case in which the subframe sets $C_{CSI,0}$ and $C_{CSI,1}$ are configured through the upper layer signaling, and sets of limited $RI_H$s and $RI_V$s of the corresponding subframe set in the case in which the subframe sets $C_{CSI,0}$ and $C_{CSI,1}$ are configured through the upper layer signaling only with respect to only one CSI process are all the same, the UE does not expect different configuration for at least one of the sets of limited $RI_H$s and $RI_V$s using the precoder subset restriction in each CSI process.

The UEs operating based on 2D precoding or 2D channel state reporting, such as the priority of the periodic channel state reporting described above, may also require the priority of the periodic channel state reporting. In the Rel-11 LTE standard, the priority is determined as RI>wPMI (wideband PMI)>wCQI (wideband CQI)>sPMI (sub-band PMI)=sCQI (sub-band CQI). When it is determined that the priority of a vertical domain is more important in the 2D channel state reporting, it can be determined as follows.

$RI_V>RI_H>wPMI_V>wPMI_H>sPMI_V=sCQI_V>sPMI_H=sCQI_H$     Priority 1:

On the contrary, when it is determined that the priority of a horizontal domain is more important, the priority in the periodic channel state reporting can be expressed as the following priority 2 using the priority 1.

$RI_V>RI_H>wPMI_V>wPMI_H>sPMI_V=sCQI_V>sPMI_H=sCQI_H$     Priority 2:

In the above expression, the vertical domain or the horizontal domain is expressed as having the priority, but it can be represented by dimension 1 and dimension 2. Selection of the priorities can be specified such that dimension 1 or dimension 2 has a higher priority, and it can also be configured that dimension 1 or dimension 2 has a higher priority using an RRC field.

When the priority of the reporting type of the PUCCH in one serving cell is the same as the priority of the reporting type of the PUCCH of another serving cell and reporting dimensions of the corresponding PUCCH reporting type are different, the channel state report of the serving cell having the PUCCH reporting type with a low reporting dimension is transmitted, and PUCCH reporting types of other cells are not considered.

In addition, when the reporting dimensions of the corresponding PUCCH reporting type are the same, the PUCCH reporting type of the cell having low ServCellIndex is reported, and the PUCCH reporting types of the other cells are not considered.

In the above embodiment, the case where the reporting dimension is low (dimension 1 when dimension 1 and dimension 2 exist) is exemplified. However, when the RRC field is used, expression such as "low priority of reporting dimension according to upper layer configuration" may be used, and expression "lower CSI-resource index" or "lower priority of CSI-resource according to upper layer configuration" may be used.

Fifth Embodiment

Figure 16:
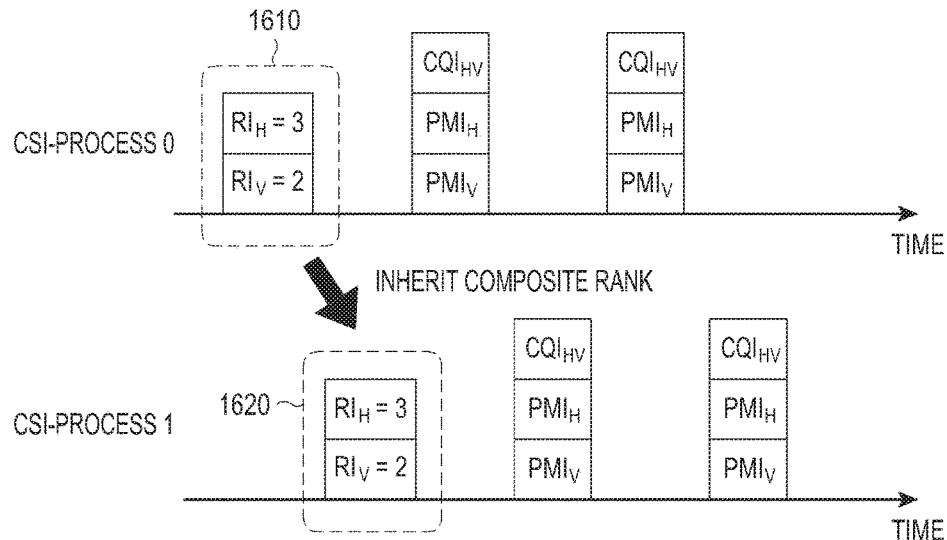
FIG. 16 is a diagram illustrating the operation of RI-reference CSI-process according to a fifth embodiment of the present disclosure.

FIG. 16 is a diagram illustrating the operation of RI-reference CSI-process according to a fifth embodiment of the present disclosure. In the fifth embodiment, $RI_{HV}$ that is a 2D rank is obtained based on reported $RI_H$ and $RI_V$, and then a channel state report is made assuming the $RI_{HV}$. Referring to FIG. 16, CSI-process 0 which is the RI-reference CSI-process of the UE reports 3 and 2 as $RI_H$ and $RI_V$ to the eNB. At this time, as described above, the UE and the eNB may share a rule for the $R_{HV}$ in advance as shown in Equation 11.

$$RI_{HV}=RI_H \times RI_V \quad \text{[Equation 11]}$$

When the rule of Equation 11 is applied to FIG. 16, the UE generates a channel state report by assuming the $RI_{HV}$ reported by the CSI-process is 0, which is the RI-reference CSI-process for channel state reporting using CSI-process 1. When the rule of Equation 11 is applied, $RI_{HV}=2\times3=6$ can be obtained. Accordingly, the UE may determine and report optimal $RI_H$ and $RI_V$ and corresponding $PMI_H$ and $PMI_V$ considering both combinations of $RI_H$ and $RI_V$ that can induce the corresponding $RI_{HV}$ as shown in Table 3.

TABLE 3

| $RI_{HV}$ | $RI_H$ | $RI_V$ |
|---|---|---|
| 6 | 1 | 6 |
| 6 | 2 | 3 |
| 6 | 3 | 2 |
| 6 | 6 | 1 |

The UE applies an available precoding combination to the corresponding $RI_H$ and $RI_V$ combination to determine the optimal $RI_H$ and $RI_V$, and notifies the eNB of the optimal $RI_H$ and $RI_V$. FIG. 16 shows another example in which the UE determines $RI_H$ as 1 and $RI_V$ as 6 and notifies the eNB of the determined result.

When the above method is used, the UE may generate a channel state report according to the $RI_{HV}$, which is the overall rank that can be supported between the UE and the eNB regardless of $RI_H$ and $RI_V$ values. The eNB may support multi-point cooperative communication to the UE reporting the channel state based on 2D-precoding using the channel state report.

In addition, in the above example, even when $RI_H$ and $RI_v$ and $PMI_H$, $PMI_V$, and $CQI_{HV}$ are reported at the same time, or $RI_H$ and $RI_V$, and $PMI_H$, $PMI_V$, and $CQI_{HV}$ are reported at different timings or different combinations, the operation based on the first embodiment is possible.

Figure 17:
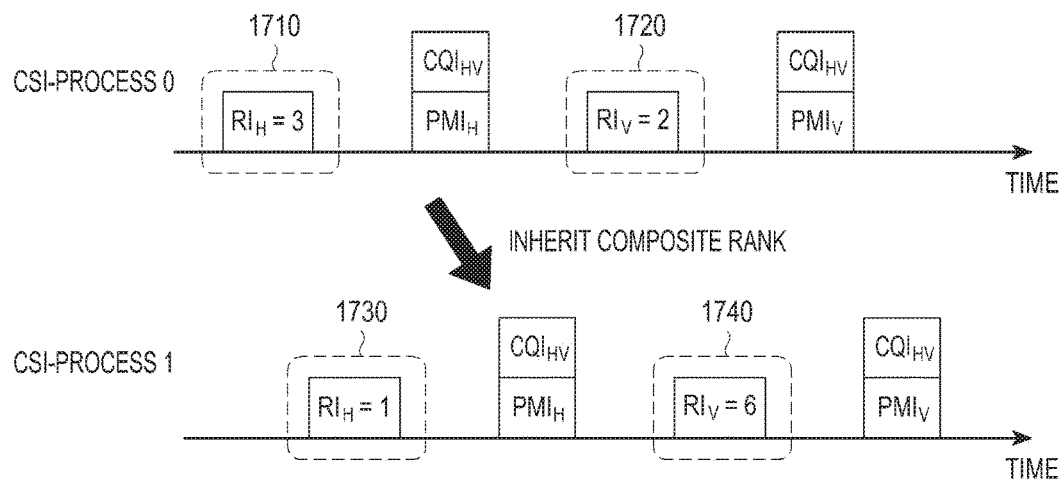
FIG. 17 is a diagram illustrating an operation when $RI_V$ and RIV, and PMIH, PMIV, and CQIHV are reported at different timings or different combinations according to an embodiment of the present disclosure.

FIG. 17 is a diagram illustrating an operation when $RI_H$ and $RI_V$, and $PMI_H$, $PMI_V$, and $CQI_{HV}$ are reported at different timings or different combinations according to an embodiment of the present disclosure.

Referring to FIG. 17, the CSI-process 0 which is the RI-reference CSI-process reports 3 (1710) as $RI_H$ and 2 (1720) as $RI_V$. Thus, a CSI-process 1 may report 1 (1730) as $RI_H$ and 6 (1740) as $RI_V$, assuming a composite rank of 6.

As described above, in the LTE Rel-11 standard, when a plurality of channel state reports overlap in the periodic state reporting, the channel state reports having a higher priority and a longer period are first made according to the importance and reporting period of the channel status reports, and the channel state reports having a lower priority and a shorter period are dropped. In this case, when one of $RI_H$ 1730 and $RI_V$ 1740 is not reported in the RI report of the CSI-process 1, the eNB calculates the composite rank $RI_{HV}$ through $RI_H$ and $RI_V$ of the CSI-process 0, so that the CSI-process 1 may inversely calculate RIV or $RI_V$ which is not reported, through the reported $RI_H$ or $RI_V$. For example, when $RI_V$ is not reported (1740), it can be confirmed that $RI_V$ is 6 by inversely calculating $RI_{HV}$=6 and $RI_H$=1 reported by the eNB. The RI used for this estimation and calculation refers to the RI-reference CSI-process and the most recently reported RI in the corresponding CSI-process.

In addition, referring to FIGS. 16 and 17, although FIGS. 16 and 17 are illustrated based on the periodic channel state reporting, the corresponding embodiment is also applicable to the aperiodic channel state reporting. Also, although $RI_{HV}$=$RI_H$×$RI_V$ is illustrated in the above drawing, the corresponding $RI_{HV}$ can also be derived using other functions or mapping tables.

Sixth Embodiment

Figure 18:
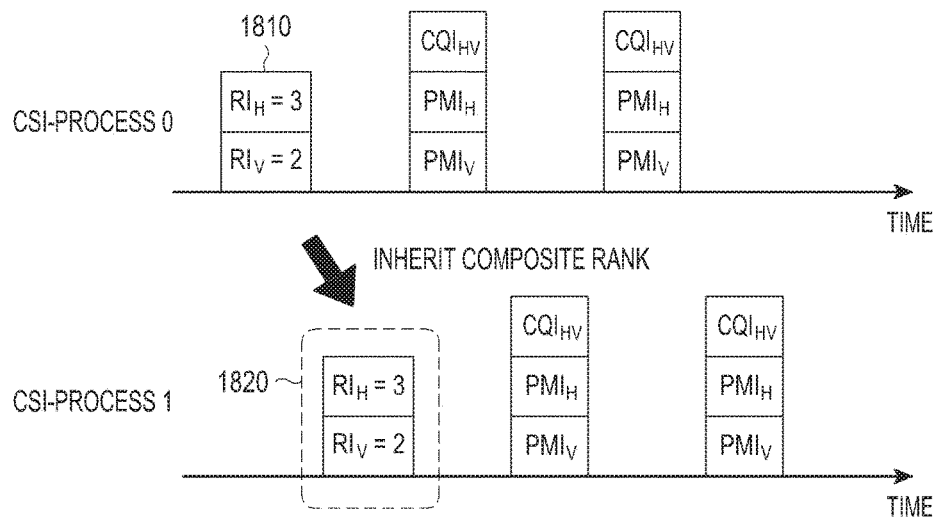
FIG. 18 is a diagram illustrating the operation of RI-reference CSI-process according to a sixth embodiment of the present disclosure.

FIG. 18 is a diagram illustrating the operation of RI-reference CSI-process according to a sixth embodiment of the present disclosure.

The sixth embodiment assumes the same $RI_H$ and $RI_V$ for other CSI-processes based on $RI_H$ and $RI_V$ of the RI-reference CSI-process, thereby generating a channel state report.

Referring to FIG. 18, the CSI-process 0 which is the RI-reference CSI-process reports 3 and 2 as $RI_H$ and $RI_V$, respectively, in 1810. According to the sixth embodiment, it is assumed that the rank of the CSI-process 1 is not determined according to the overall rank $RI_{HV}$, but $RI_H$ and $RI_V$, which are the ranks of the respective dimensions, are equally maintained. Therefore, the CSI-process 1 also reports 3 and 2 as $RI_H$ and $RI_V$, respectively, in 1820.

In a case in which the antenna shapes of the eNB are the same in each TP as well as the total number of CSI-RS ports, when interference or a distance between the TP and the UE is not completely different, a similar rank will be derived for each dimension. In order to support this case, the channel state report may be generated by maintaining and assuming the rank of each dimension, thereby reducing computation complexity of the UE.

In addition, although $RI_H$ and $RI_V$, and $PMI_H$, $PMI_V$ and $CQI_{HV}$ are simultaneously reported in the above example, even when $RI_H$ and $RI_V$, and $PMI_H$, $PMI_V$, and $CQI_{HV}$ are reported at different timings or different combinations, the operation based on the sixth embodiment is possible.

Figure 19:
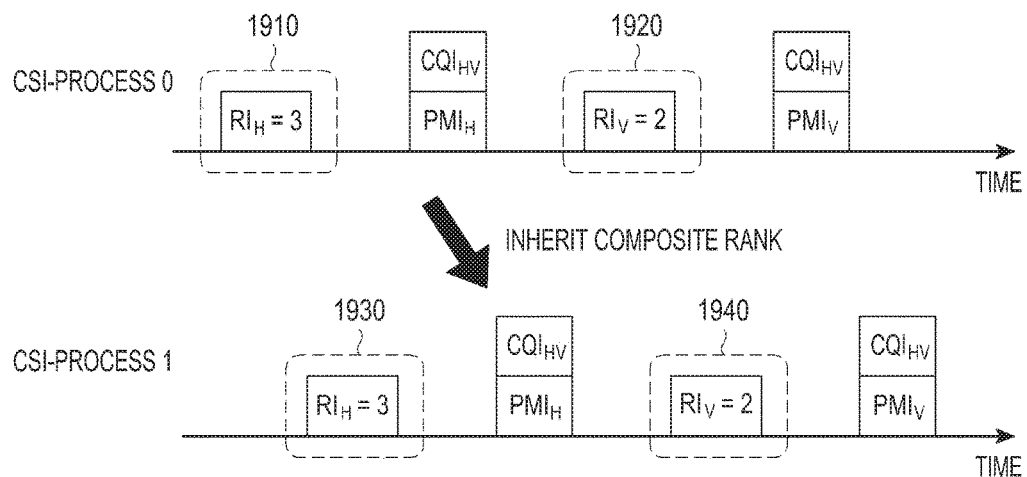
FIG. 19 is a diagram illustrating an operation when $RI_V$ and RIV, and PMIH, PMIV, and CQIHV are reported at different timings or different combinations according to the sixth embodiment.

FIG. 19 is a diagram illustrating an operation when $RI_H$ and $RI_V$, and $PMI_H$, $PMI_V$, and $CQI_{HV}$ are reported at different timings or different combinations according to the sixth embodiment.

Referring to FIG. 19, the CSI-process 0 which is the RI-reference CSI-process reports 3 (1910) as $RI_H$ and 2 (1920) as $RI_V$. Therefore, the CSI-process 1 may report 3 (1930) as $RI_H$ and 2 (1940) as $RI_V$, assuming that $RI_V$ is 3 and $RI_V$ is 2, respectively. When $RI_H$ and $RI_V$ of the CSI-process 1 are not reported, the eNB may inversely calculate $RI_H$ and $RI_V$ of the CSI-process 1 which are not reported to 3 and 2, using the $RI_H$ and $RI_V$ reported by the CSI-process 0. Compared to the fifth embodiment, the sixth embodiment has an advantage that the RI can be confirmed using the RI-reference CSI-process even if all RIs are not reported to the CSI-process other than the RI-reference CSI-process. On the other hand, in the case of the fifth embodiment, when one of the RIs is not reported, the eNB may confirm the composite RI using the RI-reference CSI-process and may confirm the RI that is not reported through the remaining RIs. However, when both the two RIs are not reported, the RI cannot be confirmed. Similar to the fifth embodiment, when referring to the RI of the RI-reference CSI-process, the most recently reported RI is referred to.

In addition, FIGS. 18 and 19 are illustrated based on the periodic channel state reporting, but the corresponding embodiment is also applicable to the aperiodic channel state reporting.

Seventh Embodiment

Figure 20:
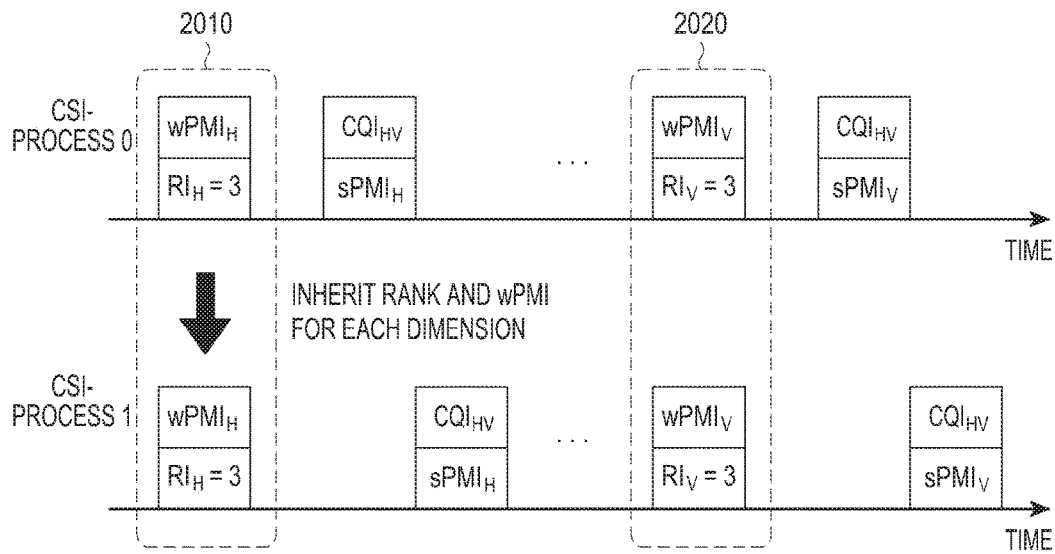
FIG. 20 is a diagram illustrating the operation of RI-reference CSI-process according to a seventh embodiment of the present disclosure.

FIG. 20 is a diagram illustrating the operation of RI-reference CSI-process according to a seventh embodiment of the present disclosure. In the seventh embodiment, it is assumed that not only the $RI_H$ and $RI_V$ of the RI-reference CSI-process but also the wideband PMI of the corresponding dimension are the same as the RI-reference CSI-process.

Referring to FIG. 20, the CSI-process 0 which is the RI-reference CSI-process reports $wPMI_H$ and $RI_H$ as 3. According to the method of the seventh embodiment, the CSI-process 1 reports $wPMI_H$ and $RI_H$ as 3 (2010). Also, when the CSI-process 0 reports $wPMI_V$ and $RI_V$ as 3, the CSI-process 1 reports $wPMI_V$ and $RI_V$ as 3 (2020).

An 8Tx codebook of the LTE Rel-10 and a 4Tx codebook of the Rel-12 may include 8-bit feedback bits. The 8-bit feedback bits are divided into 4 bits. Here, the 4 bits indicate the wideband PMI of a selected beam group, the 2 bits of the remaining 4 bits indicate one beam selected from the selected beam group, and the remaining 2 bits indicate a sub-band PMI that is used as a co-phasing term to compensate for phase shift due to characteristics of an X-pol antenna. These codebooks are called dual-stage codebooks. At this time, when a type 5 reporting the RI together with the wideband PMI of one CSI-process, a type 5 in which a similar type of PUCCH report reports the RI together with the wideband PMI of one CSI-process of the RI-reference CSI-process, and a similar type of PUCCH report collide with each other, the wideband PMI of the corresponding dimension may be assumed to be equal to the wideband PMI of the RI-reference CSI process. At this time, obviously, $RI_H$ or $RI_V$ also uses the rule of the RI-reference. Although the seventh embodiment is shown on the assumption of the method of the sixth embodiment, the seventh embodiment can be used both in the method of the fifth embodiment and the method of the sixth embodiment.

In addition, in the above example, $RI_H$ and $wPMI_H$, and $RI_V$ and $wPMI_V$ are reported, respectively. However, when $RI_{HV}$, $wPMI_H$, and $wPMI_V$ are reported simultaneously, it is assumed that $RI_{HV}$, $wPMI_H$, and $wPMI_V$ are all the same. When $wPMI_{HV}$, which combines and uses $RI_H$ and $RI_V$ together with two-dimensional wPMI, is reported simultaneously with $RI_{HV}$, $wPMI_H$, and $wPMI_V$, it is also possible to assume that both $RI_H$ and $RI_V$ and $wPMIF_{HV}$ are all the same. At this time, in the RI of each dimension, the RI of each dimension may be the same (the sixth embodiment) or the composite RI may be the same (the fifth embodiment). The RI-reference CSI-process and the RI referencing as in the fifth and sixth embodiments are all the latest RIs.

Eighth Embodiment

Figure 21:
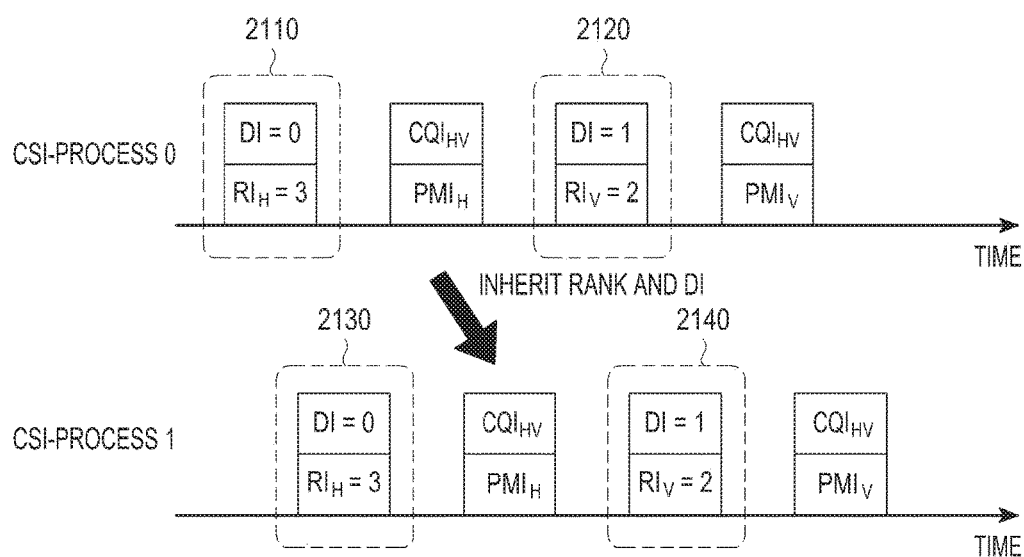
FIG. 21 is a diagram illustrating the operation of RI-reference CSI-process according to an eighth embodiment of the present disclosure.

FIG. 21 is a diagram illustrating the operation of RI-reference CSI-process according to an eighth embodiment of the present disclosure. In the eighth embodiment, a UE using 2D CSI and dimension indicator (DI) together assumes that even the DI of the corresponding dimension as well as $RI_H$ and $RI_V$ is the same as the RI-reference CSI-process.

Referring to FIG. 21, the CSI-process 0 which is the RI-reference CSI-process reports 0 to DI and 3 to $RI_H$ in 2110. According to the eighth embodiment, the CSI-process 1 reports 0 to DI and 3 to $RI_H$ in 2130. Also, the CSI-process 0 reports 1 to DI, 2 to $RI_V$ in 2120, and the CSI-process 1 reports 1 to DI and 2 to $RI_V$ in 2140.

The DI is an indicator for indicating which dimension corresponds to the periodic channel state information reporting reported by the UE, and the eNB uses the DI to determine a dimension for channel state information reporting reported by the UE. For example, when the DI is 0, the eNB may determine the DI as a horizontal dimension or a first dimension, and when the DI is 1, the eNB may determine the DI as a vertical dimension or a second dimension. The DI may be predetermined or may be configured using RRC.

In addition, as described above, in a case in which the UE and the eNB use a dual-stage codebook for feedback, even when a precoding type indicator (PTI) indicating whether short-term (or sub-band) information is fed back or whether long-term (or wideband) information is fed back is transmitted together with RI, the fifth embodiment may be applicable.

Figure 22:
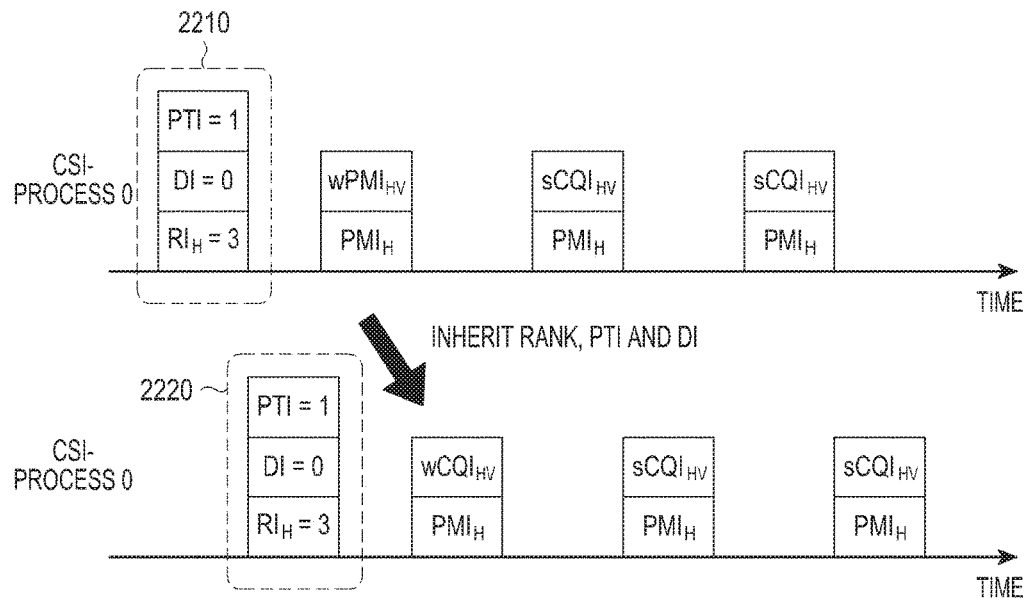
FIG. 22 is a diagram illustrating the operation of RI-reference according to the eighth embodiment when DI and PTI are reported simultaneously with RI.

FIG. 22 is a diagram illustrating the operation of RI-reference according to the eighth embodiment when DI and PTI are reported simultaneously with RI.

Referring to FIG. 22, the CSI-process 0, which is the RI-reference CSI-process, reports 0 to DI, 3 to $RI_H$, and 1 to PTI in 2210. According to the eighth embodiment, the CSI-process 1 also reports 0 to DI, 3 to $RI_H$, and 1 to PTI in 2220.

Although the PTI and the DI are separated, the conventional PTI is extended to 2 bits so that one bit may distinguish short-term (i.e., sub-band) feedback information and long-term (wideband) feedback information, which is the role the existing PTI performs, and the remaining one bit may distinguish between the first dimension and the second dimension, which is the role the DI performs.

Similarly to the seventh embodiment, the RI of the RI-reference CSI-process operating in the eighth embodiment can use both the methods of the fifth and sixth embodiments. FIG. 21 and FIG. 22 illustrate that each rank is the same in each dimension according to the method of the sixth embodiment, but it is also possible that the composite rank is the same according to the method of the fifth embodiment. Also, when the RI is not reported, the referenced RI-reference CSI-process and the RI of the corresponding CSI-process are the most recent RIs.

Ninth Embodiment

Figure 23:
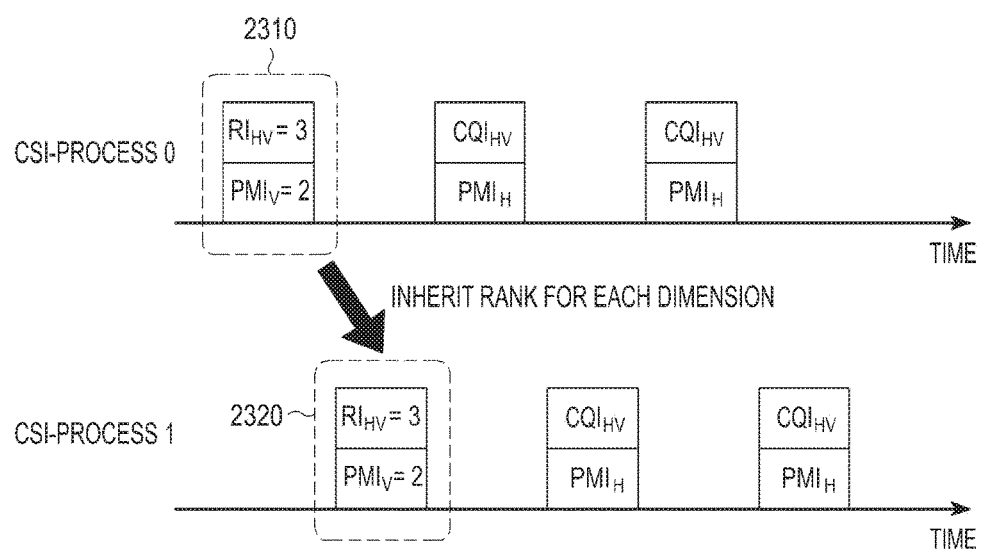
FIG. 23 is a diagram illustrating the operation of RI-reference CSI-process according to a ninth embodiment of the present disclosure.

FIG. 23 is a diagram illustrating the operation of RI-reference CSI-process according to a ninth embodiment of the present disclosure. The ninth embodiment is a method in which the UE using the 2D CSI of the RI-reference CSI-process assumes PMIV or $PMI_H$ as well as the $RI_H$ and $RI_V$.

In FIG. 23, the UE operates in the same way for the $PMI_V$ of the vertical dimension as well as the rank. When the heights of the TPs to be transmitted to the UEs are the same, the location of the UE is constant and does not change rapidly over time. Therefore, it is possible only with long-term information, and the location may be equally used for each CSI-process. Accordingly, when the corresponding $PMI_V$ is equally assumed and used, the UE may change and transmit only the vertical precoding while equally using the vertical precoding. This method is also possible in the above-mentioned dual-stage codebook. In this case, the $PMI_V$ is $wPMI_V$ that is $PMI_V$ of a wideband. In the above example, it is assumed that the PMI of the vertical dimension is assumed to be the same, but the same method can be applied to $PMI_H$ or $wPMI_H$. It is also assumed in FIG. 23 that the $RI_{HV}$ is reported in 2310 and 2320 at another point in time, but the $RI_{HV}$ may be reported at the same point in time. At this time, the method of assuming the corresponding report to be the same is applicable to the methods of the fifth embodiment and the sixth embodiment. Also, when the corresponding rank is not reported, the referring rank can refer to the RI-reference CSI-process and the most recently reported RI of the corresponding CSI-process.

Figure 24:
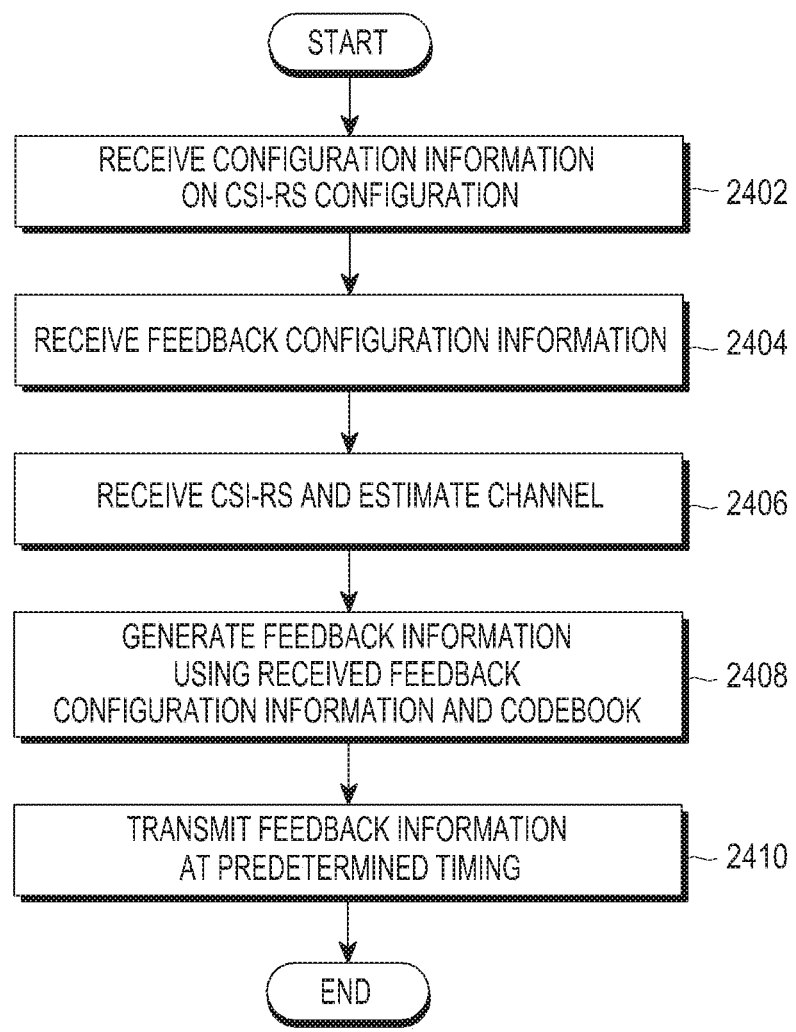
FIG. 24 is a flowchart illustrating an operational procedure of a UE according to an embodiment of the present disclosure.

FIG. 24 is a flowchart illustrating an operational procedure of a UE according to an embodiment of the present disclosure.

Referring to FIG. 24, in operation 2402, the UE receives configuration information for the CSI-RS configuration from the eNB. Based on the received configuration information, the UE may determine at least one of the number of ports for the CSI-RS, timing at which the CSI-RS is transmitted, a resource location, whether RI-reference CSI-process is configured, a corresponding CSI-process index, and transmission power information.

In operation 2404, the UE receives feedback configuration information based on the received CSI-RS.

In operation 2406, when receiving the CSI-RS, the UE estimates a channel using the received CSI-RS.

In operation 2408, the UE generates feedback information including at least one of the rank, PMI, and CQI using the received feedback configuration information and the codebook, based on a virtual channel added between the estimated channel and the CSI-RS. At this time, when the generated feedback information corresponds to the RI-reference CSI-process, the rank may be freely selected, but when the generated feedback information corresponds to the CSI-process, RI of RI-reference CSI-process or PMI is assumed to generate the remaining PMI and CQI.

In operation 2410, the UE transmits the generated feedback information to the eNB at predetermined feedback timing according to the received feedback configuration information. The generated feedback information may be channel feedback information considering two-dimensional arrangement.

Figure 25:
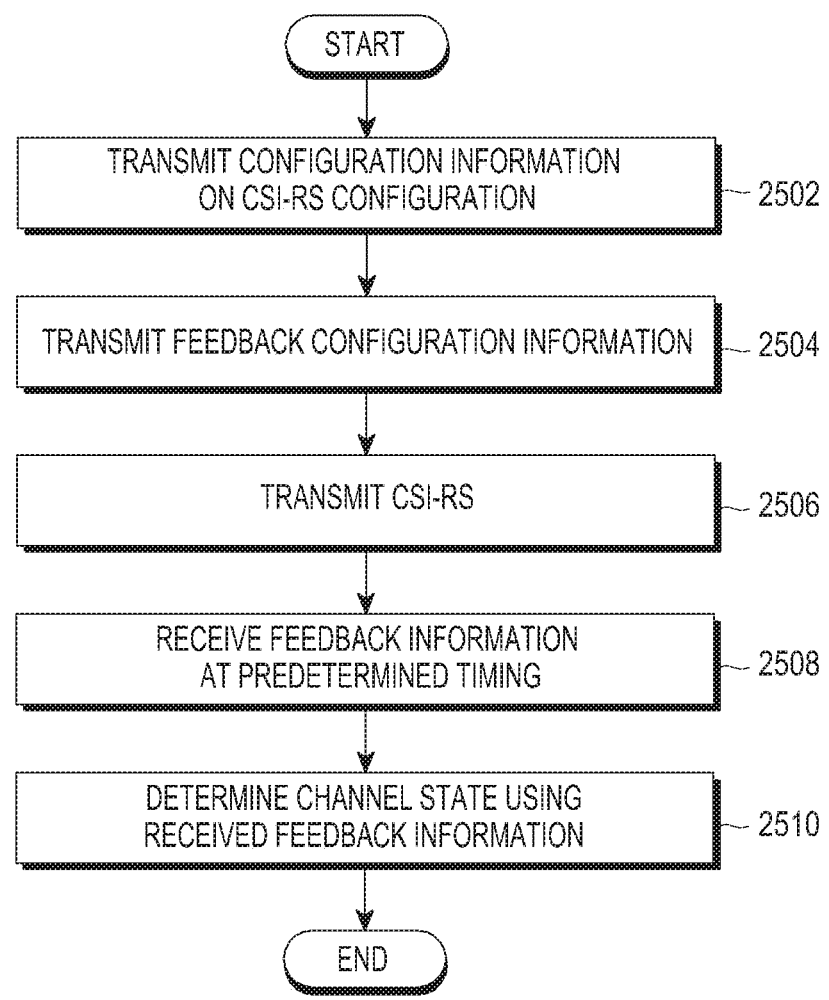
FIG. 25 is a flowchart illustrating an operational procedure of an eNB according to an embodiment of the present disclosure.

FIG. 25 is a flowchart illustrating an operational procedure of an eNB according to an embodiment of the present disclosure.

Referring to FIG. 25, in operation 2502, the eNB transmits configuration information for the CSI-RS to the UE. The configuration information may include at least one of the number of ports for the CSI-RS, timing at which the CSI-RS is transmitted, a resource location, whether RI-reference CSI-process is configured, a corresponding CSI-process index, and transmission power information.

In operation 2504, the eNB transmits feedback configuration information to the UE based on at least one CSI-RS.

In operation 2506, the eNB transmits the configured CSI-RS to the UE.

In operation 2508, the eNB receives feedback information from the UE at a predetermined timing.

In operation 2510, the eNB determines the channel condition between the UE and the eNB using the received feedback information.

Figure 26:
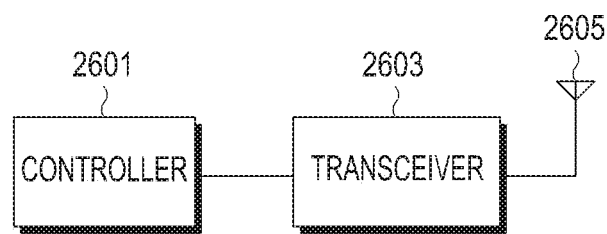
FIG. 26 is a block diagram illustrating a UE according to an embodiment of the present disclosure.

FIG. 26 is a block diagram illustrating a UE according to an embodiment of the present disclosure. For convenience of description, components not directly related to the present disclosure are not shown and described. In addition, although the present disclosure is divided into a plurality of configurations, if necessary, all of the following operations may be performed in one configuration.

Referring to FIG. 26, the UE may include a controller 2601, a transceiver 2603, and an antenna 2605. The controller 2601 may generate a UCI to be transmitted to the eNB, and calculate and apply the transmission power of the PUCCH. Alternatively, the controller 2601 may transmit data to be transmitted to the PUSCH to the transceiver 2603. Also, the controller 2601 may determine a coverage enhancement level that the UE should use for PUCCH/PUSCH transmission, and may transmit the determined coverage enhancement level to the transceiver 2603. Also, the controller 2601 may estimate a channel using the received CSI-RS, and may generate feedback information including at least one of a rank, a PMI, a CQI based on the virtual channel added between the estimated channel and the CSI-RS using the received feedback configuration information and codebook.

The transceiver 2603 may generate a signal according to a PUCCH format according to the UCI and the PUCCH transmission power received from the controller 2601. Alternatively, the transceiver 2603 may generate a signal according to the PUSCH format according to the data received from the controller 2601 and the PUSCH transmission power. The transceiver 2603 may process the received signal and may transmit the processed signal to the eNB via the antenna 2605. Also, the transceiver 2603 may receive configuration information, feedback setting information, and CSI-RS for the CSI-RS configuration from the eNB. The transceiver 2603 may transmit the generated feedback information to the feedback timing defined by the eNB.

Figure 27:
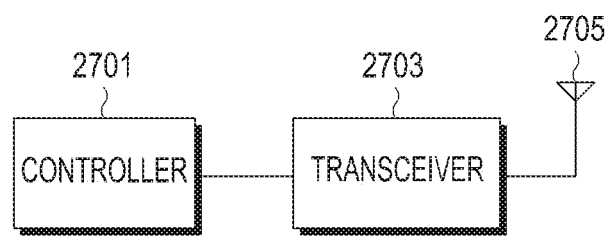
FIG. 27 is a block diagram illustrating an eNB according to an embodiment of the present disclosure.

FIG. 27 is a block diagram illustrating an eNB according to an embodiment of the present disclosure. For convenience of description, components not directly related to the present disclosure are not shown and described. In addition, although the present disclosure is divided into a plurality of configurations, if necessary, all of the following operations may be performed in one configuration.

Referring to FIG. 27, the eNB may include a controller 2701, a transceiver 2703, and an antenna 2705. The eNB may process the signal received through the antenna 2705 in the transceiver 2703 and then may transmit the processed signal to the controller 2701. Specifically, the transceiver 2703 may receive the coverage enhancement level information of the PUCCH/PUSCH transmitted by the UEs and may use the coverage enhancement level information to receive the PUCCH/PUSCH. The transceiver 2703 may transmit the received UCI information and data to the controller 2701. The transceiver 2703 may transmit and receive data reference signals and feedback information from or to the UE.

The controller 2701 processes the data using the UCI information. Also, the controller 2701 controls the states and operations of all components of the eNB. The controller 2701 may allocate CSI-RS resources, feedback resources of the UE, and feedback timing to the UE. The controller 2701 may adjust and allocate the feedback resources and timing so that feedback transmitted from a plurality of UEs does not collide with each other. The controller 2701 may receive and analyze feedback information from the UE.

Meanwhile, the exemplary embodiments disclosed in the specification and drawings are merely presented to easily describe technical contents of the present disclosure and help the understanding of the present disclosure and are not intended to limit the scope of the present disclosure. That is, it is obvious to those skilled in the art to which the present invention belongs that different modifications can be achieved based on the technical spirit of the present invention. Further, if necessary, the above respective embodiments may be employed in combination.

The invention claimed is:

1. A method for controlling an uplink transmission power of a terminal in a wireless communication system, the method comprising:
   identifying whether a coverage enhancement mode of the terminal is a coverage enhancement mode A (CE mode A) or a coverage enhancement mode B (CE mode B);
   identifying an uplink transmission power corresponding to a first subframe of a plurality of subframes using a maximum uplink transmission power of the terminal corresponding to the first subframe, a path-loss between the terminal and a base station, and a power control adjustment value corresponding to the first subframe, in response to identifying that the coverage enhancement mode of the terminal is the CE mode A;
   identifying the maximum uplink transmission power of the terminal corresponding to the first subframe as the uplink transmission power corresponding to the first subframe, in response to identifying that the coverage enhancement mode of the terminal is the CE mode B; and
   transmitting data or control information through a physical uplink shared channel (PUSCH) or a physical uplink control channel (PUCCH) on the plurality of subframes with the identified uplink transmission power,
   wherein the identified uplink transmission power is maintained in the plurality of subframes.

2. The method as claimed in claim 1, wherein the uplink transmission power for transmitting the PUSCH or the PUCCH on the plurality of subframes is limited by the maximum uplink transmission power.

3. The method as claimed in claim 1, wherein the plurality of subframes for an uplink repetition transmission are determined based on a repetition level for the identified coverage enhancement mode and the repetition level is configured through an upper layer signaling message or downlink control information.

4. The method as claimed in claim 1,
   wherein the plurality of subframes for an uplink repetition transmission are determined based on a repetition level for the identified coverage enhancement mode, and
   wherein the repetition level is determined in consideration of at least one of the path-loss, a number of antennas of the terminal, or a size of a reception buffer of the terminal.

5. The method as claimed in claim 1, further comprising:
   receiving, from the base station, a transmission power control (TPC); and
   updating the power control adjustment value according to the TPC, wherein the power control adjustment value is updated based on at least one of whether the uplink transmission power is configured by an upper layer, whether a random access response is received, or whether a repetition level of the uplink transmission power is changed.

6. A method by a base station for controlling an uplink transmission power of a terminal in a wireless communication system, the method comprising:
transmitting, to the terminal, information on a repetition level for a coverage enhancement mode, the coverage enhancement mode including a coverage enhancement mode A (CE mode A) or a coverage enhancement mode B (CE mode B); and
receiving, from the terminal, data or control information through a physical uplink shared channel (PUSCH) or a physical uplink control channel (PUCCH) on a plurality of subframes with the uplink transmission power,
wherein the uplink transmission power corresponds to a first subframe of the plurality of subframes,
wherein the uplink transmission power is set using a maximum uplink transmission power of the terminal corresponding to the first subframe, a path-loss between the base station and the terminal, and a power control adjustment value corresponding to the first subframe, in response to the information on the repetition level indicating the CE mode A,
wherein the uplink transmission power is set as the maximum uplink transmission power of the terminal corresponding to the first subframe, in response to the information on the repetition level indicating the CE mode B, and
wherein the uplink transmission power of the terminal is maintained in the plurality of subframes.

7. The method as claimed in claim 6, wherein the uplink transmission power for transmitting the PUSCH or the PUCCH on the plurality of subframes is limited by the maximum uplink transmission power.

8. The method as claimed in claim 6, wherein the plurality of subframes for an uplink repetition transmission are determined based on the repetition level and information on the repetition level is transmitted through an upper layer signaling message or downlink control information.

9. The method as claimed in claim 8, wherein the plurality of subframes for the uplink repetition transmission are determined based on the repetition level and the repetition level is determined in consideration of at least one of the path-loss, a number of antennas of the terminal, or a size of a reception buffer of the terminal.

10. The method as claimed in claim 6, further comprising:
transmitting, to the terminal, a transmission power control (TPC) for updating the power control adjustment value;
wherein the power control adjustment value is updated based on at least one of whether the uplink transmission power is configured by an upper layer, whether a random access response is received, or whether the repetition level of the uplink transmission power is changed.

11. A terminal for controlling an uplink transmission power of a terminal in a wireless communication system, the terminal comprising:
a controller configured to:
identify whether a coverage enhancement mode of the terminal is a coverage enhancement mode A (CE mode A) or a coverage enhancement mode B (CE mode B),
identify an uplink transmission power corresponding to a first subframe of a plurality of subframes using a maximum uplink transmission power of the terminal corresponding to the first subframe, a path-loss between the terminal and a base station, and a power control adjustment value corresponding to the first subframe if the coverage enhancement mode of the terminal is the CE mode A,
identify the maximum uplink transmission power of the terminal corresponding to the first subframe as the uplink transmission power corresponding to the first subframe if the coverage enhancement mode of the terminal is the CE mode B, and
transmit data or control information through a physical uplink shared channel (PUSCH) or a physical uplink control channel (PUCCH) on the plurality of subframes with the identified uplink transmission power,
wherein the identified uplink transmission power is maintained in the plurality of subframes.

12. The terminal as claimed in claim 11, wherein if the uplink transmission power for transmitting the PUSCH or the PUCCH on the plurality of subframes is limited by the maximum uplink transmission power.

13. The terminal as claimed in claim 11, wherein the plurality of subframes for an uplink repetition transmission are determined based on a repetition level for the identified coverage enhancement mode and the repetition level is configured through an upper layer signaling message or downlink control information.

14. The terminal as claimed in claim 11,
wherein the plurality of subframes for an uplink repetition transmission are determined based on a repetition level for the identified coverage enhancement mode, and
wherein the repetition level is determined in consideration of at least one of the path-loss, a number of antennas of the terminal, or a size of a reception buffer of the terminal.

15. The terminal as claimed in claim 11,
wherein the controller is further configured to:
receive, from the base station, a transmission power control (TPC), and
update the power control adjustment value according to the TPC, and
wherein the power control adjustment value is updated based on at least one of whether the uplink transmission power is configured by an upper layer, whether a random access response is received, or whether a repetition level of the uplink transmission power is changed.

16. A base station for controlling an uplink transmission power of a terminal in a wireless communication system, the base station comprising:
a transceiver; and
a controller configured to:
transmit, to the terminal, information on a repetition level for a coverage enhancement mode, the coverage enhancement mode including a coverage enhancement mode A (CE mode A) or a coverage enhancement mode B (CE mode B),
receive, from the terminal, data or control information through a physical uplink shared channel (PUSCH) or a physical uplink control channel (PUCCH) on a plurality of subframes with the uplink transmission power,
wherein the uplink transmission power corresponds to a first subframe of the plurality of subframes, wherein the uplink transmission power is set using a maximum uplink transmission power of the terminal corresponding to the first subframe, a path-loss between a serving cell and the terminal, and a power control adjustment value corresponding to the first subframe if the coverage enhancement mode is the CE mode A, wherein the uplink transmission power is set as the maximum uplink transmission power of the terminal corresponding to the first subframe if the coverage enhancement mode is the CE mode B, and wherein the uplink transmission power of the terminal is maintained on the plurality of subframes.

17. The base station as claimed in claim 16, wherein if the uplink transmission power for transmitting the PUSCH or the PUCCH on the plurality of subframes is limited by the maximum uplink transmission power.

18. The base station as claimed in claim 16, wherein the plurality of subframes for an uplink repetition transmission are determined based on the repetition level and the information on the repetition level is transmitted through an upper layer signaling message or downlink control information.

19. The base station as claimed in claim 18, wherein the plurality of subframes for the uplink repetition transmission are determined based on the repetition level, and wherein the repetition level is determined in consideration of at least one of the path-loss, a number of antennas of the terminal, or a size of a reception buffer of the terminal.

20. The base station as claimed in claim 16, wherein the controller is further configured to transmit, to the terminal, a transmission power control (TPC) for updating the power control adjustment value, and wherein the power control adjustment value is updated based on at least one of whether the uplink transmission power is configured by an upper layer, whether a random access response is received, or whether the repetition level of the uplink transmission power is changed.

* * * * *